(12) United States Patent
Kwok

(10) Patent No.: US 6,456,042 B1
(45) Date of Patent: Sep. 24, 2002

(54) METHOD AND APPARATUS FOR CHARGING BATTERIES AT REDUCED OVERCHARGE LEVELS

(75) Inventor: Wellington Y. Kwok, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 09/722,941

(22) Filed: Nov. 27, 2000

(51) Int. Cl.⁷ .................................................. H02J 7/00
(52) U.S. Cl. ........................................ 320/134; 320/128
(58) Field of Search ................................. 320/134, 128, 320/157, 159, 162, 164; 324/430, 431

(56) References Cited

U.S. PATENT DOCUMENTS 5,659,237 A * 8/1997 Divan et al. ................. 320/119
5,929,601 A * 7/1999 Kaib et al. ................... 320/113
6,025,704 A * 2/2000 Elliott .......................... 323/280

* cited by examiner

Primary Examiner—Edward H. Tso
Assistant Examiner—Lawrence Luk
(74) Attorney, Agent, or Firm—Margaret A. Dobrowitsky

(57) ABSTRACT

Battery charging methods and associated chargers which are capable of rapidly charging a battery while subjecting it to reduced levels of overcharging. The methods described are capable of being utilized within numerous battery charging systems for batteries spanning a range of chemistries, such as lead-acid, nickel-based, and lithium-based batteries. Upon detection of the onset-of-overcharge during the charge process, a variable voltage lid is imposed ($V_{LID}=v(\phi)+\beta\log\phi+\kappa\phi$) which reduces the maximum voltage that may be applied to the battery as a function of charge acceptance which is typically estimated by a calculation based on state-of-charge. Additionally, the voltage lid can be approximated with step-wise voltage lids which are responsive to the level of charge acceptance within the battery.

71 Claims, 19 Drawing Sheets

METHOD AND APPARATUS FOR CHARGING BATTERIES AT REDUCED OVERCHARGE LEVELS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention pertains generally to battery chargers and more particularly to a method for charging batteries which utilizes a variable voltage lid which is responsive to the estimated charge acceptance level to thereby prevent overcharging of the battery as it nears a fully charged state.

2. Description of the Background Art

The process by which a battery is charged determines the relative usable capacity of that battery and to a large degree the service life that can be expected from the battery. Insufficient charging of a battery results in a requisite reduction in battery capacity, wherein the available ampere-hours are inadequate in consideration of the weight, size, and cost of the battery. In contrast, overcharging a battery leads to a reduction in service life for the cells of the battery. Determining a proper charge rate for any battery is complicated by the fact that a fully depleted battery can accept a higher charge rate than a battery which is approaching a state of full-charge, therefore, batteries are typically charged at a variable rate. Unfortunately, the situation is further complicated by the fact that as the battery approaches a fully charged state the charge acceptance drops and charge voltage rises to create an overcharge potential which produces damaging effects on the battery.

Numerous charging methods have been developed, therefore, to provide a charge rate which can fully charge the battery while introducing a limited amount of overcharging. For example, constant current chargers typically generate a constant charge current held within a limited voltage, such that the current drops off as the battery approaches the upper voltage limit of the charger output. FIG. 1 depicts a battery under charge 10, wherein a battery 12 is connected to a voltage source 14 with upper limit $V_{MAX}$ which drives a constant current through the constant current regulator 16 to provide charge current. The charger illustrated in FIG. 1 is a typical example of a CI/CV charger employed in a variety of applications where it supplies a constant current limited by a constant upper voltage limit.

Vehicles often employ CI/CV charging systems which are typically designed to maximize service life by maintaining the battery state-of-charge (SOC) at a moderate level, so as to reduce the deleterious overcharging effects. In battery charging literature and practice, a number of algorithms concerning battery charging provide compromises between service life and performance. A common approach is to maintain the battery at a nominal level of about an 80% state-of-charge (SOC) at all times such that the vehicle power system operates within a narrow SOC range from about 70% to 90%. However, in view of the demands for increases in energy density it is prudent to attempt to maximize the SOC operating window and utilization of the battery.

Numerous misconceptions exist with regard to battery charging which have been promulgated within typical battery charging systems. An application engineer may posit the question "at what voltage should a specific battery be charged?" The question is understandable in relation to FIG. 1, however, it is misleading, as are many similar questions and does not lead toward establishing mechanisms for proper charging. To advance the art of charger design toward maximum battery utilization requires re-examination of the underlying charging concepts. Considered in a strict sense, a battery may not be charged by a "constant-voltage" source as it is the concomitant charging current associated with the driving force of the voltage that forces energy storage to occur within the battery. The "constant-voltage" is more correctly the upper limit of the charging voltage which is not exceeded during charging. It will be appreciated that charging at a "constant-voltage" would force unrealistic charge current levels into a depleted battery.

It is beneficial to understand the factors relating to a battery being charged. While undergoing charging, the voltage seen at the terminals of the battery is substantially the sum of three components represented as:

$$\text{Measured Voltage} = \text{Equilibrium Voltage} + \text{Polarization Voltage} + \text{OhmicVoltageDrop} \quad (1)$$

wherein the equilibrium voltage is commonly referred to as the open-circuit battery voltage, $V_{OC}$; the polarization voltage describes the combined effects of concentration and ion/charge-transfer; while the ohmic voltage drop is the voltage drop associated with the ohmic resistance at the given charge current. In contrast to typical electrical components, a battery is an energy storage device that absorbs and provides electrical energy according to an internal electrochemical balance which has an associated reaction voltage that is a dynamic reflection of the "driving force" function and depends strongly on the past operating history, or time derivatives, experienced by the battery.

FIG. 2 depicts basic charging effects, wherein the battery voltage profile is shown as a function of state-of-charge (SOC) for a series of charging currents 20b through 20f in reference to an equilibrium voltage 20a. The equilibrium voltage 20a is the voltage which would be measured across the open-circuit battery at that point in the charge cycle as represented by the voltage curve if the applied charging current were interrupted or disconnected and equilibrium established. Battery charging current is often expressed as a ratio, C-rate, which expresses the ratio of charging current to nominal battery capacity, $I/Q_N$, so that the charge rate may be expressed independently of battery capacity. Charging current curves 20b through 20f identify increasing levels of charging current applied to the battery with 20b at a 0.05C-rate, 20c at a 0.10C-rate, 20d at a 0.33C-rate, 20e at a 0.67C-rate, and 20f at a 1C-rate. It can be seen that during charging, the induced battery voltage exceeds the equilibrium voltage 20a as one would expect in order to force energy into the battery. The curves also indicate that as the battery nears full charge (100% SOC), the battery voltage increases more readily than the equilibrium voltage so as to cause the voltage curves to diverge. In literature, the divergence characteristic of the charge curve from the equilibrium voltage is commonly interpreted as an increase in battery internal resistance as a function of SOC, and simple equivalent circuits and mathematical models are derived accordingly. However, the rationale of such internal resistance concepts are contradictory to the actual chemical and electrochemical nature of a battery. As active materials are converted from lead sulfate, $PbSO_4$ (insulator) in the discharged state in both electrodes to lead dioxide, $PbO_2$ ($1.2 \times 10^{-6}$ to $2 \times 10^{-5}$ $\Omega/m$) within the positive electrode and metallic lead Pb ($10^{-7}$ $\Omega/m$) within the negative electrode, the overall cell resistance decreases rather than increases. The attendant increase in sulfuric acid concentration that accompanies charging generally causes a minimal increase (less than 10%) on the conductivity of the electrolyte. The electrolyte concentration is typically in the range from 1.250 to 1.280 kg/L. Furthermore, changes to the resistance of metallic parts, e.g., terminals, cell interconnects, lugs, during a single charge cycle is negligible such that ohmic resistance is largely unchanged. Finally it should be appreciated that temperature increases caused by ohmic and joule heating result in further decreases in ohmic resistance within the battery.

It will be appreciated, therefore, that the concept of increasing internal resistance during battery charging is misleading, since resistance levels within the battery do not significantly increase as the state-of-charge increases. In reality, the decrease of charge acceptance is primarily caused by physical blockage of mass transfer as a result of gas entrapment. Mathematically, it is the apparent resistance ($\Delta V/I$) that is actually increased as a battery is being recharged, but the increase is not due to an increase in electrical resistance.

A constant voltage drop caused by the physical blockage accompanies any specific level of accepted charging current and is referred to as a "polarization voltage" effect. The combined polarization voltage can be expressed by a simplified Tafel correlation that summarizes the polarization and ohmic effects:

$$\eta = \alpha + \beta \log(\phi) + \kappa \phi \quad (2)$$

wherein $\eta$ is the combined polarization voltage, $\alpha$ and $\beta$ are the Tafel coefficients, $\kappa$ is the characteristic resistance, and $\phi$ is the equivalent charging current in reference to battery capacity. This correlation is typically valid for instances of charging at low-to-moderate SOC levels which exhibit no overcharging effects, while being charged at a constant-current below a 4C-rate of charge and is typical for the majority of lead-acid batteries. As charging current approaches zero, the mathematical correlation becomes invalid due to the presence of the logarithmic term. In practice, this phenomenon may be described as a minimum amount (or yield) of input energy which is required to polarize or charge the surface layer in order to initiate the process of material conversion.

As a battery approaches a full-charge state (100% SOC), the voltage profile shows a typical characteristic of sharp voltage increase. At this point, the majority of active materials has been converted. The excess charging current is diverted to effect overcharge reactions resulting in the formation of hydrogen and oxygen, known as "gassing" or "outgassing", by electrochemically dissociating the water molecules. An increase in the measured battery voltage is induced by the water dissociation process. FIG. 3 is a representation of a typical charge voltage profile showing a single constant-current charge cycle curve 22 along with constituent voltage contributions. The battery equilibrium voltage 24 follows the smooth curve approaching a flat, or nearly flat, region of the curve at 100% SOC. The charging of the battery induces a chemical polarization voltage 26, while the flow of current through the fixed battery resistance results in an ohmic voltage drop 28 which also contributes to the overall charge voltage. The measured voltage generally follows a Tafel relationship up to the gassing point which typically occurs between 50% and 80% SOC for the aforesaid charge rates. It should be recognized that the voltage drop due to ohmic resistance remains relatively constant in view of any specific charge current level. A sudden increase in the measured voltage is exhibited within the upper voltage curve 22 that results in an "overcharge potential" 30 being applied to the battery which typically occurs in conjunction with a corresponding decrease in the charge acceptance due to the depletion of active reaction sites and the physical blockage of acid diffusion by the production of gas bubbles. As the overcharge potential increases, the effective charging current that induces chemical and ionic polarization at the surface of electrodes decreases. The battery charging energy becoming predominately consumed by the overcharge reactions rather than electrochemical conversion.

FIG. 4 represents voltages exhibited for various charge currents as a function of state-of-charge (SOC) for a typical battery being charged by means of a constant-current/constant-voltage (CI/CV) charging method. Curves "A", "B", and "C", respectively, are a high, medium, and low rate of charge. The dashed lines 32, 34, 36 starting on the right of curves A, B, C, are representative of fixed voltage levels to which a CI/CV charger is being limited. FIG. 5 illustrates an example of CI/CV charging wherein curve "A" from FIG. 4 is limited by the median voltage level 34. The constituent voltages associated with the high current charge curve "A" from FIG. 4, wherein the charging voltage of curve "A" rises up and is limited by the medium voltage limit 34. The constituent ohmic drop 38 and polarization voltage drop 40 are shown cumulative to the equilibrium voltage 42 of the battery. It will be recognized that although the charging current is being limited by the medium voltage limit 34, there still exists a considerable level of overcharge potential 44 which fosters deleterious outgassing effects. As the charging current decreases as a result of current being limited by the charge voltage limit 34, both the ohmic and polarization voltages decrease accordingly, such that an increasing overcharge current needs to be delivered to the battery in order to maintain a constant voltage. If the supplied initial charge current level is increased, this would precipitate early voltage regulation at lower values for SOC that would result in a slow CV charging step that has an excessively long-tailed charge time profile. Early SOC regulation is the typical method applied to the charging of lithium-based batteries. The charging voltage is set to the equilibrium voltage of a fully charged battery to avoid any amount of overcharging, however as a result, the battery then lacks a sufficient voltage potential to charge rapidly or to reach a 100% state-of-charge.

To reduce the required charging period, a number of designs have employed algorithms which determine a so-called characteristic voltage limit which are applied to produce constant-voltage charging current when the charging voltage reaches that upper limit of voltage. FIG. 6 is illustrative of this approach wherein the median current charging profile "B" as depicted in FIG. 4, is limited by the same median voltage threshold 34 so as to reduce the overcharge potential 46 shown in FIG. 6. In following the described teachings of these designs it is apparent that rapid charging may be achieved only at the cost of sacrificing battery longevity due to the high levels of attendant overcharge potential. The setting for the voltage limit characteristically results in a tradeoff between overcharge and charge time. Despite the aforesaid drawbacks of the fixed voltage limited designs, these designs are embodied within the common charging methods applied to the charging of most batteries, in particular lead-acid and nickel-based batteries.

FIG. 7 represents the low current charging curve "C" wherein the median voltage charge threshold 34 is never reached and the battery is exposed to the full overcharge potential 48. This method of regulation has been implemented within charger designs, such as those which employ negative delta-V measurements within sealed lead-acid and metal hydride batteries. The voltage limit within these designs provides for a means of detecting erroneous high-current charging or runaway conditions, but does not limit the overcharging which occurs from normal operation.

As shown above, overcharging a battery is an inevitable result of employing a constant-voltage charge step. These simple illustrations have additionally shown that (1) it is meaningless to specify a "charging voltage" because CV charging and/or overcharge can occur at any SOC depending only on the applied current; and (2) a high charging voltage does not (and will not) improve the effectiveness of battery charging but only provides a more complete charge return by means of excessive overcharge.

It will be appreciated that in each instance of voltage limitations imposed on the charging current there was an appreciable level of undesirable battery overcharging. Contemplating the use of the high limit 32 or the low limit 36 as shown in FIG. 4, it will be understood that each of these limits results in either overcharging the battery or restricting the battery from reaching, or quickly reaching, a full state of charge. It will be appreciated, therefore, that specifying a "charging voltage", as illustrated above, does not mitigate the problems of slow charge rates or the attendant battery damage caused by overcharge potentials, while increasing the voltage threshold can speed charging only by inducing increased overcharge potentials.

FIG. 8 illustrates the hypothetical case of charging a battery in a true constant-voltage charging process. During the initial stages of charging the fixed charge voltage 50 of the charger attempts to drive an unlimited amount of electrical current or electrons into the battery forcing a rapid movement of ionic species toward the electrode-electrolyte interface. Comprising the voltage drop between the equilibrium voltage 52 and the charge voltage 50, are the ohmic voltage drop 54, the polarization voltage drop 56, and the overcharging potential 58. As the material conversion near the electrolyte interface approaches saturation, the battery charge acceptance decreases drastically due to the lack of chemical (or ionic) and mass-transfer driving force. Thus, the charge current drops rapidly to a low level (yet sufficiently high to maintain a constant voltage) wherein a great portion of the input energy is wasted, and serves only to promote the overcharge reactions.

It should also be noted that typical vehicular charging systems operate in a similar fashion as a CI/CV charging system except that the charging current in the CI phase is limited by the maximum power output of the generator. Instead of a CI phase, a rapidly decreasing input current profile is observed as the battery voltage increases, i.e., V×I=constant, which is often mistaken as CV charging only.

A method of stepped-current charging is often employed for charging batteries which promotes a relaxation of built-up overcharge gasses to provide increased charge efficiency. A stepped-current charger is exemplified in U.S. Pat. No. 5,561,360 issued Oct. 1, 1996 to Ayres et al. which is incorporated herein by reference. FIG. 9 shows a block diagram 60 of a typical charger which employs a controller.

Battery 62 is charged by programmable current source 64 in a stepped current mode controlled by controller 66 employing a voltage limit set for $V_{MAX}$. The voltage limit scales upwardly as the charge acceptance of the battery declines so as to increase the driving force (overvoltage) to aid energy input. Graphs for this type of charging are shown in FIG. 10 and FIG. 11. The voltage, current and gas flow produced by this method during charging are shown in FIG. 10 with the associated applied voltage as a function of state-of-charge being shown in FIG. 11. It will be appreciated that the method produces high levels of overcharging within the battery. The maximum charging current typical of this type of charging is about C/3 (C=battery capacity in ampere hours) which results in reasonable performance with overcharging of about 105–125%, wherein overcharging is specified as a ratio of input ampere-hour capacity to total discharge ampere-hour capacity (100% depth-of-discharge of the previous discharge cycle). The overcharge ratio is often evaluated within the industry using the nominal capacity of the test battery as the denominator. For example, for a 50-Ah battery, a fully discharged battery may be recharged by returning about 62.5 Ah (overcharge ratio of 125%) to the battery, wherein the ampere-hour capacity being returned is often used as a termination setting for ampere-hour integration. As illustrated in FIG. 10, overcharging is significantly reduced during the initial high-current steps, yet with continuous and progressively increasing overcharge being needed to force the battery voltage to reach the increasing voltage levels and effect the subsequent current regulation steps. As the charging current reduces to very low levels (e.g., as indicated by the last two current steps in FIG. 11), the battery voltage is unable to reach the required voltage limit which requires that the charging procedure additionally impose a time-based or ampere-hour based limitation such as illustrated in FIG. 10. It will be appreciated that the charger provides beneficial reductions of outgassing at low charge rates, however, the moderate levels of outgassing which still remain and the additional limits of time and/or ampere-hour which must be imposed are significant detractors to applicability of the approach.

Therefore a need exists for a method of charging a battery that does not require striking a win-lose tradeoff between overcharging and charging time. The methods described for the present invention satisfy those needs, as well as others, while overcoming deficiencies inherent within previous charging methods.

BRIEF SUMMARY OF THE INVENTION

The present invention provides a battery charging method which is suitable for charging any battery system rapidly from an arbitrarily low state-of-charge while minimizing overcharging as the SOC progresses toward full charge. A major adverse effect of overcharging and side reactions is a deterioration of the service life for the battery as the result of changes which are exemplified by water loss and the shedding of active material. The charging method comprises a technique based on the macroscopic relationship of electrical and electrochemical behavior of a battery under charge that is suitable for use with charging a variety of batteries, most notably lead acid batteries, and may be employed within a variety of charging systems, such as chargers similar to that depicted in FIG. 9.

The charging method determines an optimum variable voltage charging lid locus which is based upon the charge-acceptance capability of the battery that generally follows a decreasing curve which may be associated to the actual state-of-charge (SOC) within the battery at any point in time.

The optimum variable voltage charging lid may alternatively be approximated by either a similarly shaped relationship, or as a series of stepped-down voltage limits which approximate the shape of the variable voltage charging lid curve. The degree of matching required being determined by the level of overcharging to be allowed within a particular application. The variable voltage lid commences when the battery nears a full-state of charge and it provides moderation of the applied current which facilitates rapid battery charging without the high overcharge potentials typified by CI and CI/CV battery charging approaches. The battery charging method of the present invention is suitable for charging batteries of various chemistries, such as lead-acid, nickel-based (i.e. nickel-cadmium, nickel-metal-hydride) and lithium-based batteries.

An object of the invention is to provide a method of charging batteries that does not subject the batteries to high overcharge potentials.

Another object of the invention is to provide a charge method that can be utilized for rapidly charging batteries without attendant damage thereto.

Another object of the invention is to provide a charging method that can be implemented easily and at low-cost within a variety of charging systems.

Another object of the invention is to provide a charging method that operates efficiently within a highly dynamic state-of-charge environment wherein the battery vacillates between discharging and recharging.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
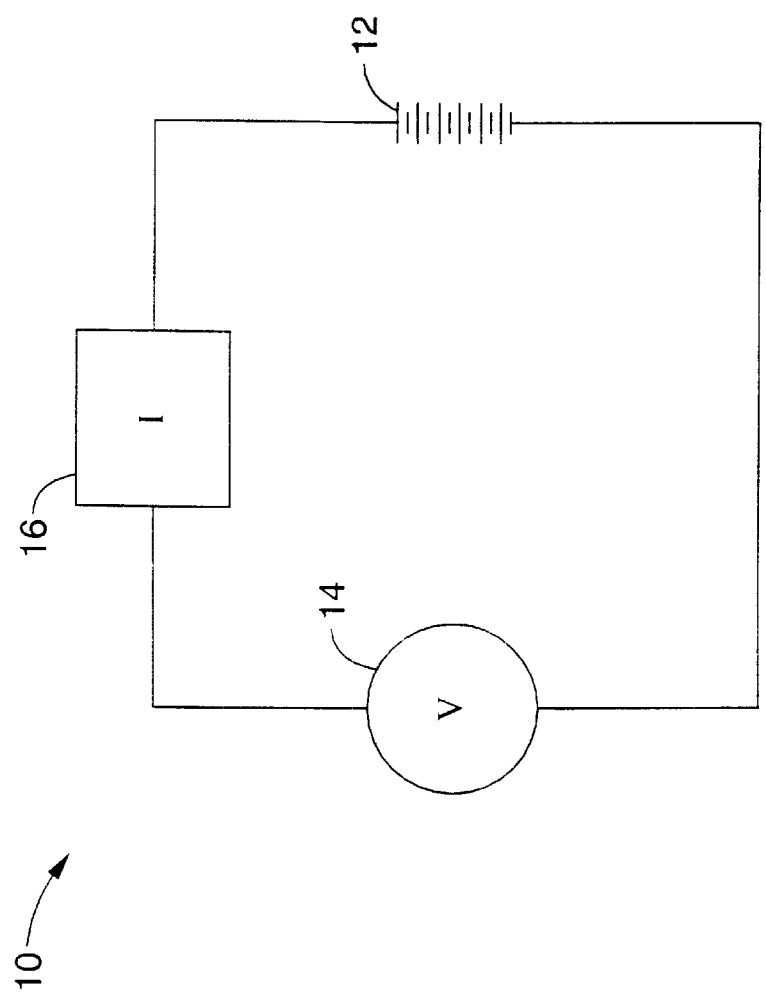
FIG. 1 is a simplified schematic of a battery being charged by a CI/CV charger.
Figure 2:
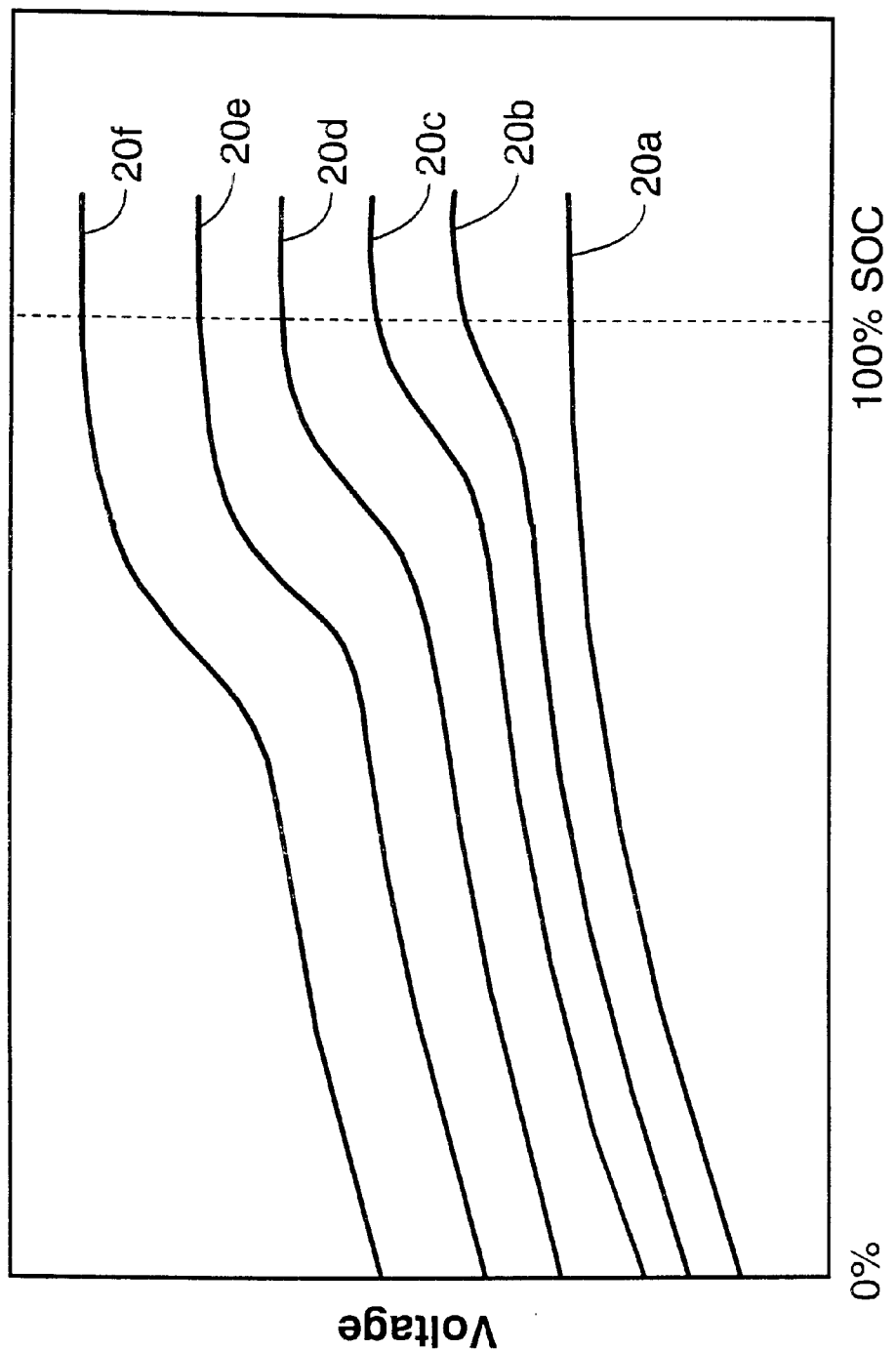
FIG. 2 is a graph of charge voltage curves in relation to state-of-charge for a series of charge current rates.
Figure 3:
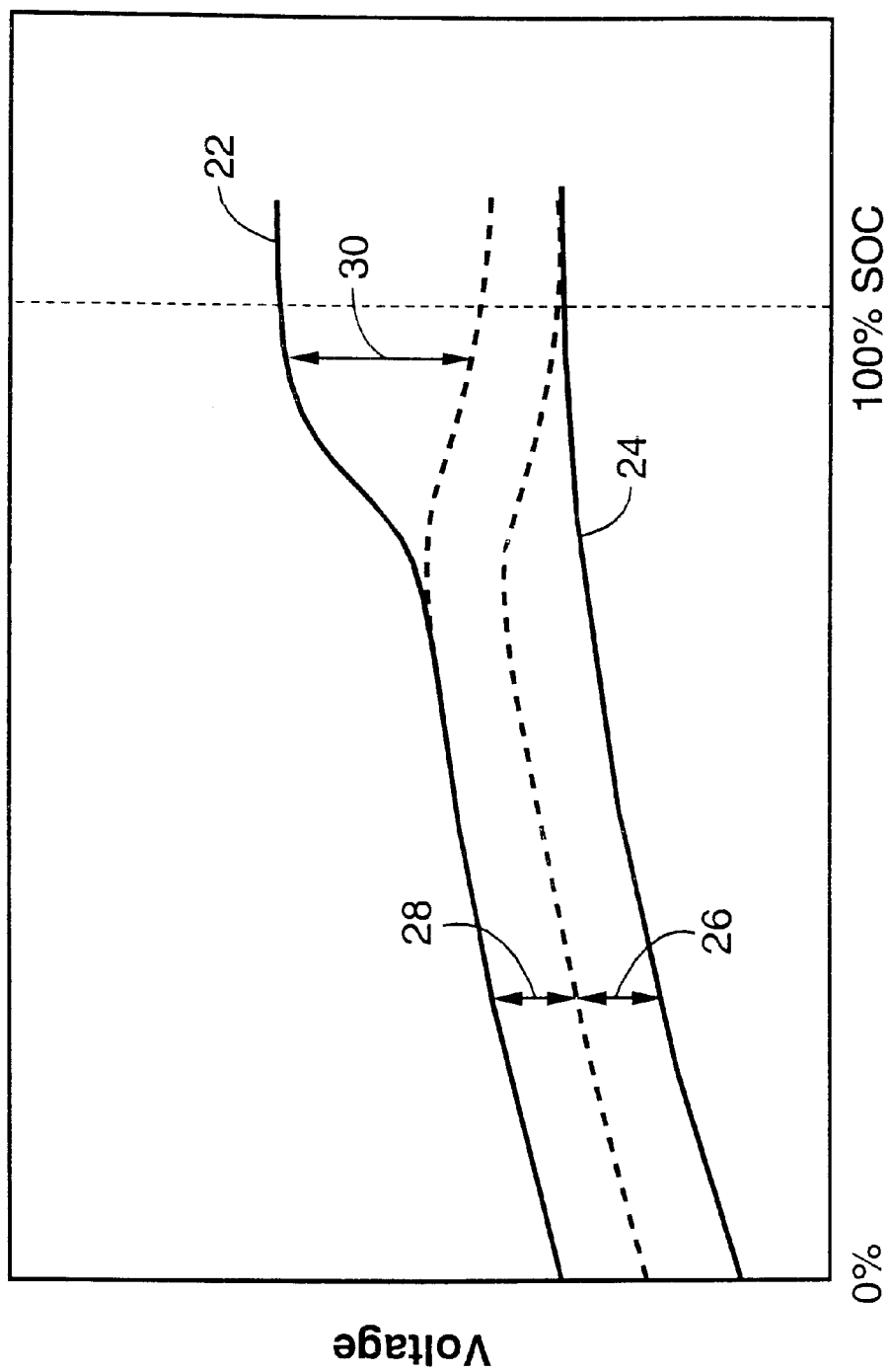
FIG. 3 is a graph of charge voltage in relation to state-of-charge for a specific charge current showing the battery equilibrium voltage upon which the contributions of ohmic drop and polarization voltage are depicted.
Figure 4:
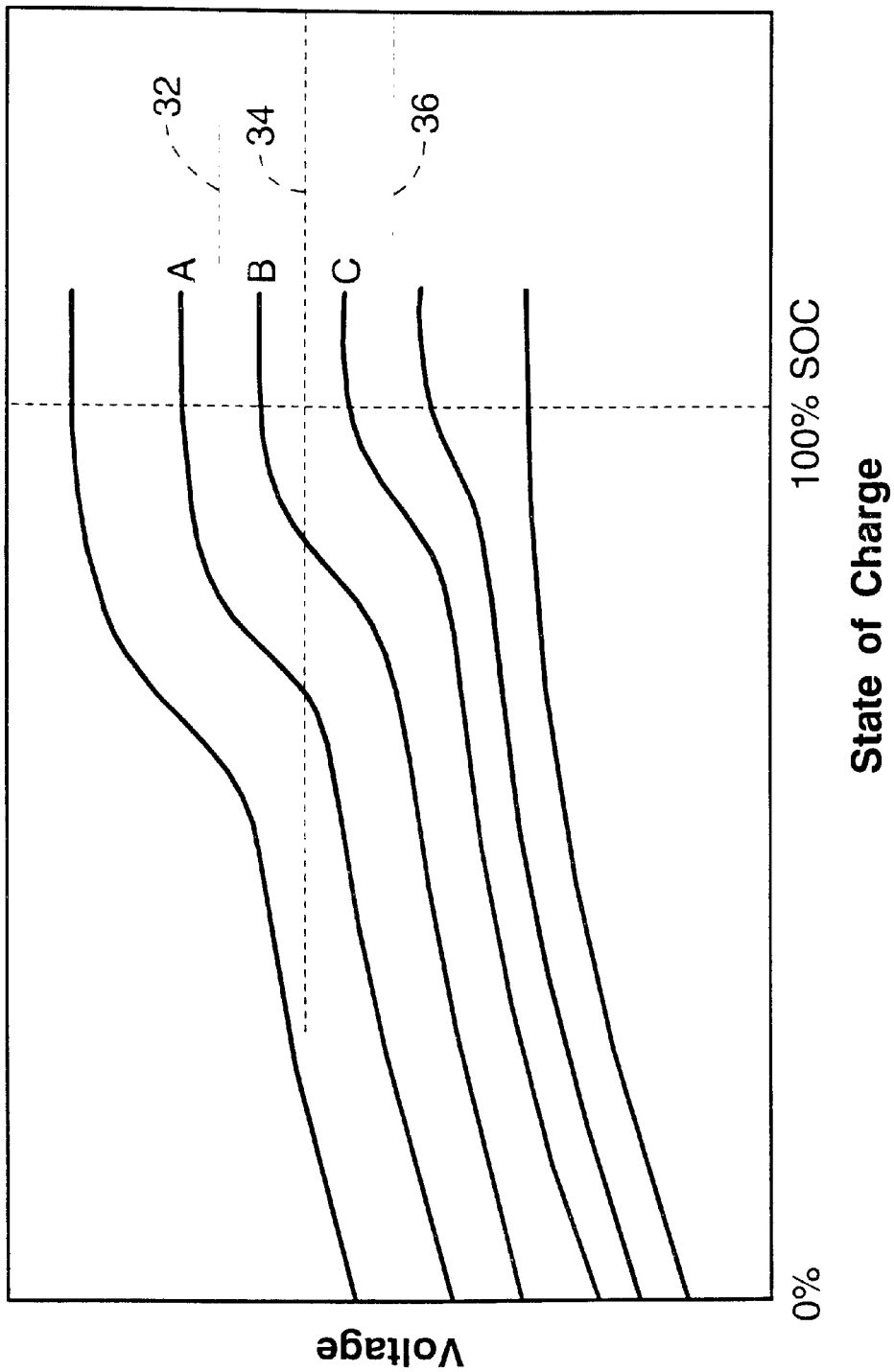
FIG. 4 is a graph of charge voltage profiles in relation to state-of-charge for a series of charge current rates in which charge current curves "A", "B", and "C" are shown in relation to selected fixed voltage limiting thresholds.

Referring more specifically to the drawings, for illustrative purposes the present invention is embodied in the methods and chargers generally shown in FIG. 12 through FIG. 19. It will be appreciated that the methods may vary as to the specific steps and sequence, and that the chargers may depart as to the configuration and specific components without departing from the basic concepts as disclosed herein.

To provide an efficient charging mechanism the charger must be capable of matching the supplied charge to the charge acceptance of the battery so that complete and rapid charging may be provided while exposing the battery to a minimal amount of overcharge potential. This method, therefore, departs dramatically from previous methods which often encourage high levels of overcharging to obtain full charge levels. The following describes the approach taken to achieve this level of charging efficiency.

Continuing with the description of the charging process, the measured battery voltage, $V_{BAT}$, at any time during a recharge can be expressed in mathematical terms for a given charging current (or equivalent current of $\phi$) as follows:

$$V_{BAT}=V_{OC}+\alpha+\beta\log(\phi)+\kappa\phi \quad (3)$$

The equation expresses the summation of the equilibrium and polarization voltages. Expressed more precisely, the measured battery voltage at a given charge state, current and temperature, may be approximated by:

$$V_{BAT}(\phi,\phi,T)=v(\phi)+\beta\log(\phi)+\kappa\phi+\gamma(T) \quad (4)$$

where $v(\phi)=V_{OC}(\phi)+\alpha$ is the minimum voltage at which polarization (yield) occurs in the absence of any dynamic effect, φ is given in terms of a fractional charge state (0.0 to 1.0) or state-of-charge as a percentage (0 to 100%), and γ(T) is a temperature-compensation function at a temperature T. The function of $V_{BAT}$ can then be used to estimate the battery voltage during a charge cycle exclusive of overcharging, as shown by the solid lines in FIG. 12. Thus, any deviation from this mathematical correlation is an indication of the onset-of-overcharge, reduction in charge acceptance, or both. During actual operation of a charging system overcharging commences upon reaching a sufficient SOC for a given current. The overcharge curves associated with each charge curve is shown as dashed lines in FIG. 12.

In practice, the empirical coefficients (i.e. ν(φ) or α, β, κ, and γ) can be evaluated experimentally by correlating the battery voltage with various charging currents, input capacities and temperatures. The above mathematical correlation thereby indicates that the four common variables given by voltage, current, state-of-charge, and temperature, are uniquely related to each other with a single degree of freedom. An example of employing the correlation can be found in the estimation of battery state-of-charge from the steady-state voltage which results from a fixed charging current at a known temperature. The discharge process of a battery may also be similarly estimated.

Figure 12:
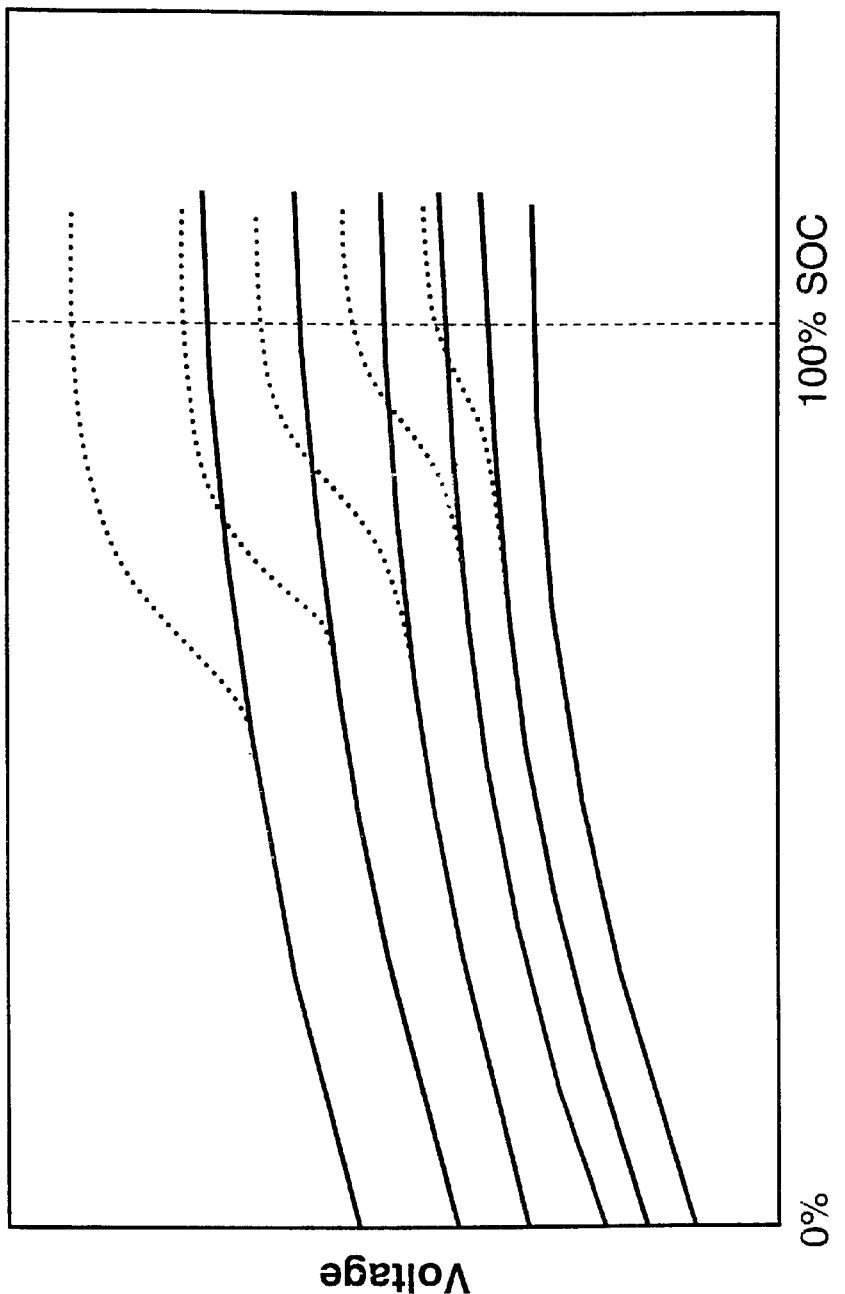
FIG. 12 is a graph of Tafel correlation curves overlaying charge voltage curves shown as dashed lines.

The graph in FIG. 12 contains curves, shown as solid lines, which represent the battery voltage without any overcharge potential wherein charging proceeds exclusively according to Eq. (4). The charge acceptance capability of the battery is continuously decreasing as the charging cycle progresses. Conversion of active materials proceeds rapidly during high current charging, which tends toward reducing the ionic concentration near the electrode-electrolyte interface at a rate which exceeds the rate of acid diffusion which therefore solely promotes material conversion proximal the electrode surface. In either case, the loss of active reaction sites operates to divert the input energy to side reactions earlier in the charging process which can be expressed as a percentage value for state-of-charge. As the charging current is reduced, material conversion efficiency increases as the electrochemical reaction rate is comparable to the rate of acid diffusion and other chemical processes, such that the charge acceptance capability of the battery improves.

The overall charging process may be expressed more precisely by incorporating the effect of overcharge. The following equation assumes the overcharge reaction adheres to the Tafel correlation:

$$V_{BAT}(\phi,\dot\phi,T)=\nu(\phi)+\beta\log(\dot\phi_1)+[\xi+\psi\log(\dot\phi-\dot\phi_1)]+\kappa\phi+\gamma(T) \quad (5)$$

where ξ and ψ are the new Tafel coefficients, $\dot\phi_1$ and $(\dot\phi-\dot\phi_1)$ are the corresponding current fractions distributed to useful material conversion and overcharge reaction, respectively, while the ratio of $\dot\phi_1/\dot\phi$ determines the charging efficiency or charge acceptance capability.

Figure 13:
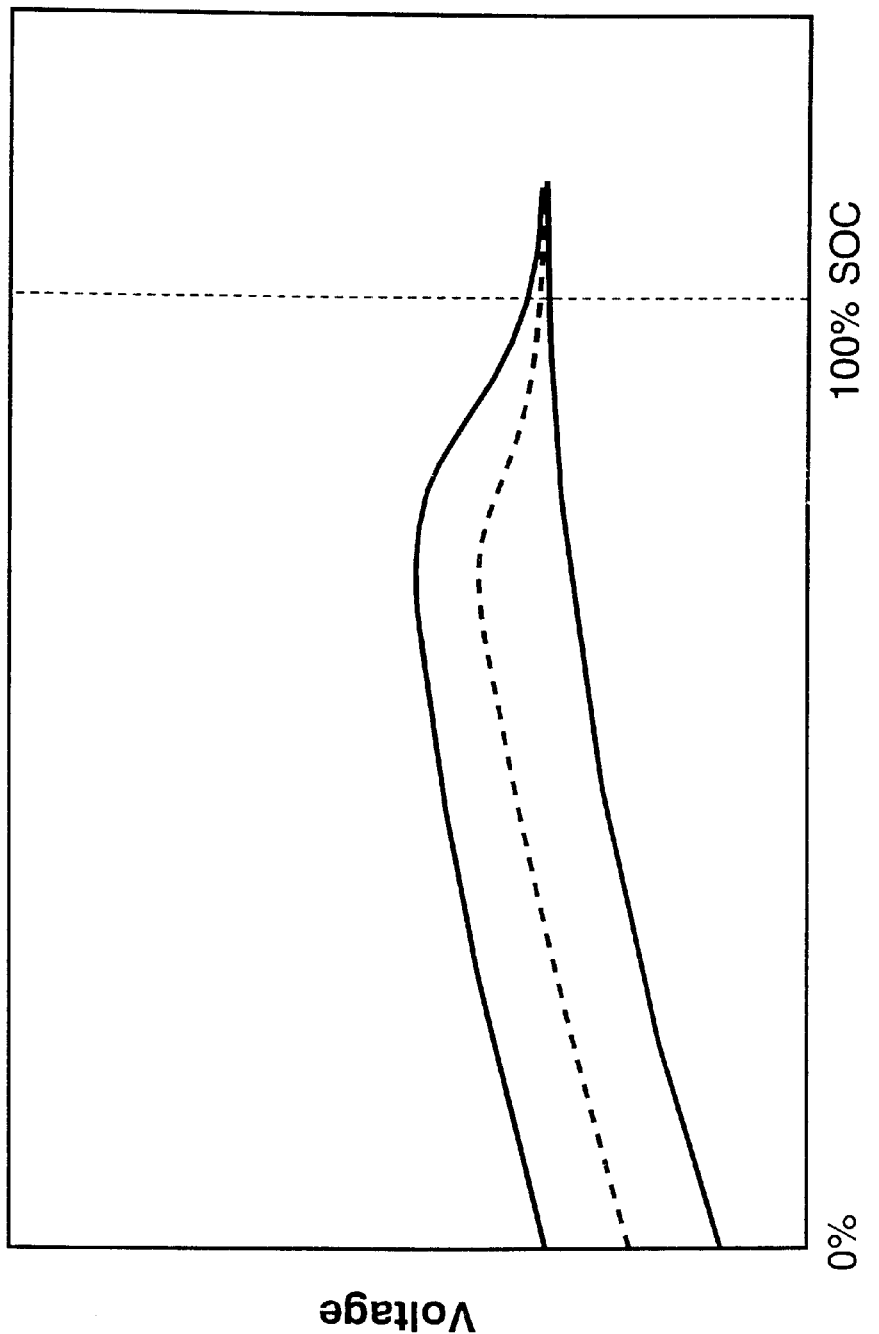
FIG. 13 is a graph of optimum charging voltages as a function of state-of-charge shown in relation to battery equilibrium voltage.

An optimum battery charging method is therefore defined for use herein to deliver the precise amount of electrical current so as to yield polarization of the active materials so that useful material conversion may take place while additionally overcoming the ohmic resistance of the inactive materials, such as lead wires, plate lugs, terminal contacts, and interconnects, along with ohmic, or joule, heating. The optimum charging method should in addition eliminate wasteful energy divergence, for example that which supplements the overcharge reactions. FIG. 13 depicts a graphical representation of this optimum battery charging process in which the charge acceptance capability approaches 100% at low charge states and gradually decreases to 0% at the full-charge state. In theory, the end-of-charge voltage of a battery should be equal to the equilibrium voltage of a fully charged battery as shown here in order to achieve a charge efficiency of 100%. (i.e. 0% waste). Furthermore, the point of deviation, as seen from the divergence of the solid and dashed charge curves of FIG. 12, is expected to coincide with the exact state of the onset-of-overcharge condition and reduction in charge acceptance which is indicative of an electron input rate which has exceeded the maximum rate of material conversion under the prescribed conditions. Subsequent to the charging process having reached an onset-of-overcharge condition, the described optimum charging can be estimated by applying an estimated voltage lid given by:

$$V_{LID}=\nu(\phi)+\beta\log\dot\phi+\kappa\phi \quad (6)$$

Figure 14:
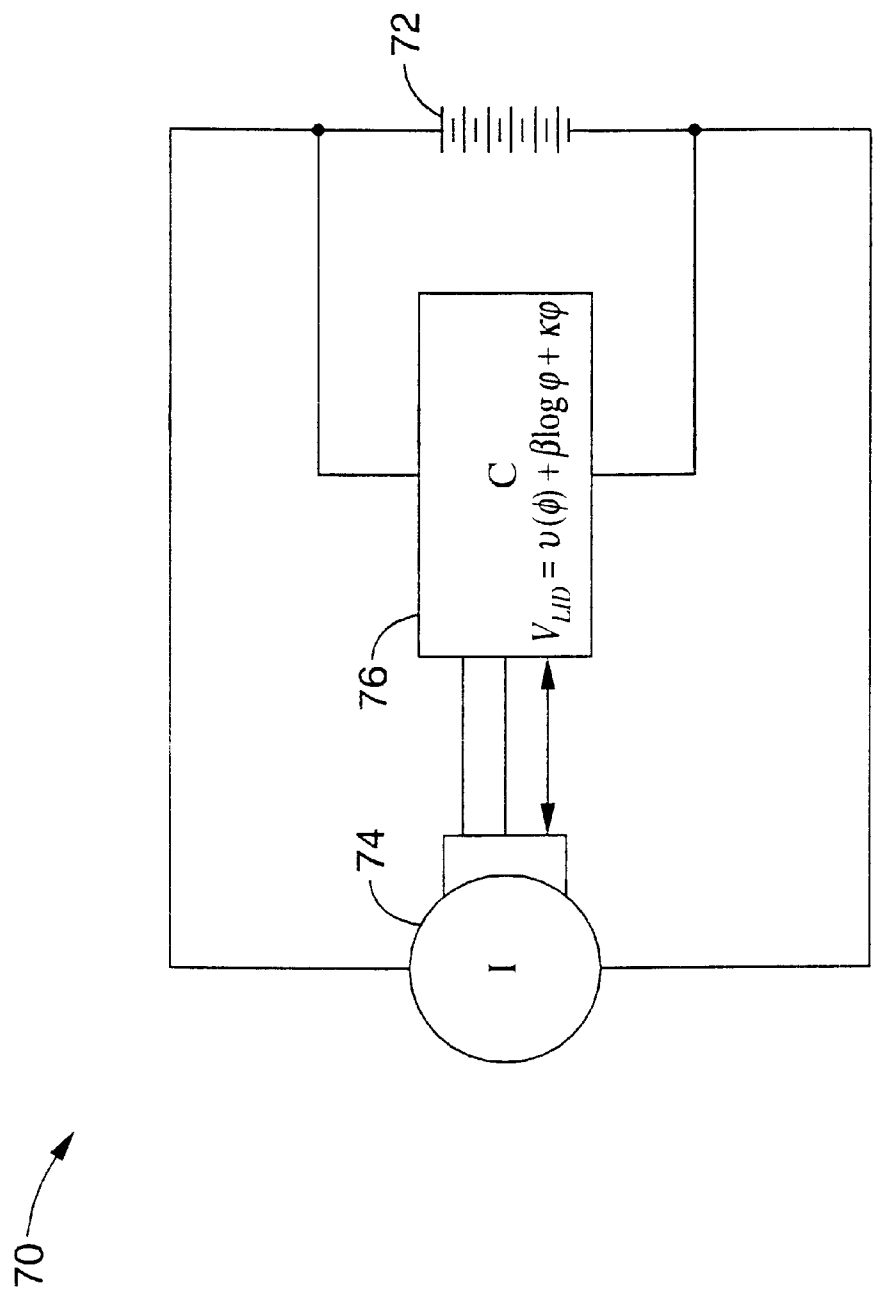
FIG. 14 is a simplified schematic of a battery being charged by a charger having a variable voltage lid according to the present invention.

FIG. 14 depicts a circuit 70 in which charging current is applied to a battery 72 by a programmable current source 74 controlled by a charge controller 76 utilizing the variable voltage lid function of Eq. (6), or an approximation thereof according to the invention. It will be appreciated that employing the voltage lid procedure requires a mechanism for detecting (or estimating) the onset-of-overcharge condition while charging. The mechanism used for detecting the onset-of-overcharge can vary depending on the application. For example, in steady-state type battery charging (e.g., off-broad chargers in service bays or charging stations for electric vehicles), the model-based approach, as an extension of Eq. (4), provides a systematic method of predicting the onset-of-overcharge conditions so that the applied current may be properly regulated using advanced control strategies. However, it is uncommon for an in-vehicle battery charging system to attain steady-state charging at a fixed current as presented above. It will be appreciated that conditions of steady-state charging within an automobile may be approached only during periods of extended highway driving.

The voltage lid curve of the "optimal battery charging method" may be approximated by using a simpler stepped-voltage lid procedure so as to substantially eliminate overcharging and other harmful effects. A series of voltage limits, or critical voltages, are defined and utilized which minimize the amount of overcharging that is allowed to take place in accordance with various state-of-charge levels with respect to temperature. The maximum charging current allowed is thereby limited automatically at a fixed voltage level in order to approximate Eq. (4).

It will be appreciated from the prior discussion that the charge acceptance of the battery is greatest at low charge levels. It is possible, therefore, at least in theory, to charge the battery as follows:

(1) initiate charging of a battery at any current and SOC;

(2) achieve ultra-fast charging without overcharge; and (3) attain a full recharge while preventing overcharge.

Figure 15:
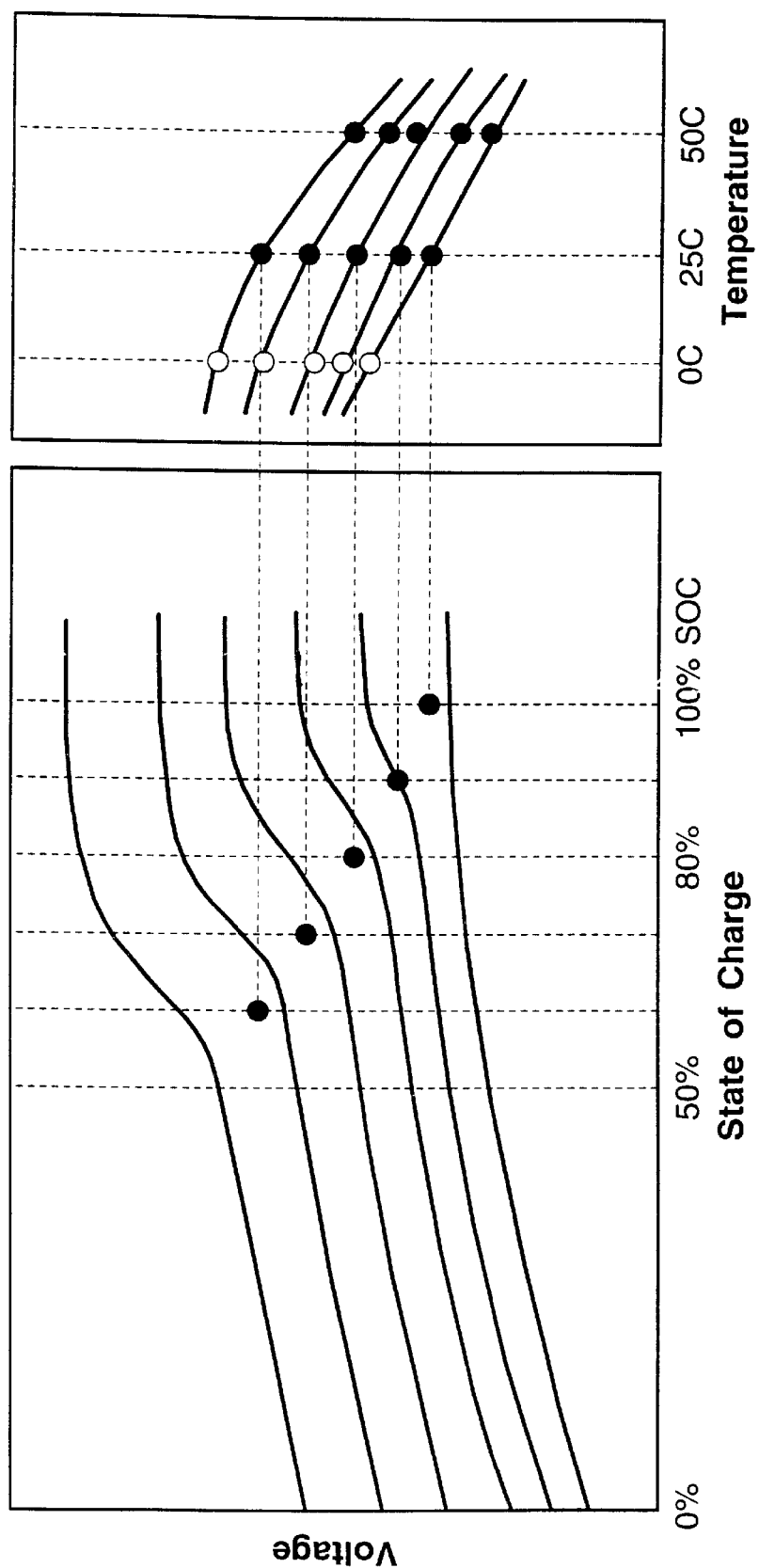
FIG. 15 is a graph illustrating the determination of stepped-down-voltage lids according to one aspect of the present invention.

Accordingly, the charging process may be initiated at an extremely high current for very low values of SOC, wherein substantially all the initial input current is utilized in the material conversion process. Upon detecting the onset of overcharging, the applied current is regulated to match precisely the predefined optimal locus of voltage, current, and SOC. Detecting the onset of overcharging may be exemplified by checking charge voltage against corresponding values determined for critical voltage, or by means of detecting the actual onset of battery outgassing. However, in numerous applications it is economically impractical to derive and implement an elaborate model-based system to provide control of battery charging. In these applications, discrete functions of critical voltage may be derived which may be utilized to approximate the "optimal" charge control method described. A five point discrete voltage-lid method is represented in FIG. 15 wherein the five points indicate voltage limits to be adhered to as a function of state-of-charge at a temperature of 25° C. The temperature graph toward the right of FIG. 15 provides correction values for the voltage lids in reference to temperature. The reader will appreciate that the method of the invention can be practiced as a continuous function or a step wise, discrete function, which approximates the described "optimum charging method" profile.

An approximation of the optimum charge method may be additionally developed as a series of charging regimes which are associated with SOC ranges, for example three regimes, (1) below 80% SOC, (2) 80% to 90% SOC, and (3) above 90% SOC, which can simply be considered as low, nominal and high SOC. When the SOC of the battery is low, the technique promotes fast charging by introducing a very high level of charge current and yet it avoids any overcharge potentials. It will be appreciated that fast-charging at a maximum current exceeding a 2C-rate is typically possible with lead-acid and certain other battery types being charged according to the invention at low SOC levels since the voltage-lid or onset-of-overcharge condition can be determined for any charge rate following the described procedure. Typically, the charge-rate constraint within a particular system is in regard to the available charge current at the low-SOC levels, for example the 1.2 C-rate as previous described was a limit of the experiment instead of the battery, as the current source could supply a maximum of 60 A. As the SOC of the battery enters the nominal range of operation the charging method applies a moderate level of charge current. As the SOC of the battery reaches the high range, at or near full charge, the charger provides "float" charging of the battery with a low voltage limit to minimize the effect of overcharging while continuously maintaining the high charge levels. The charging method according to the present invention provides a unique approach to fast-charge a battery to a fully-charged state without incurring untoward battery damage as a result of outgassing effects caused by overcharge potentials. Conventional fast-charge systems perform perfunctorily often up to as much as 80% state-of-charge, yet fail to complete full charging unless the battery is transferred to a form of equalization charger. (i.e. using overcharging to drive additional energy into the battery at less than 20% efficiency). These conventional fast-charge methods emphasis charging to a partial state-of-charge, and the technique is exemplified within electric buses whose battery systems operate between 50% and 80% SOC during the day, while requiring a periodic (overnight) equalization charge to fully charge and maintain the batteries.

Figure 16:
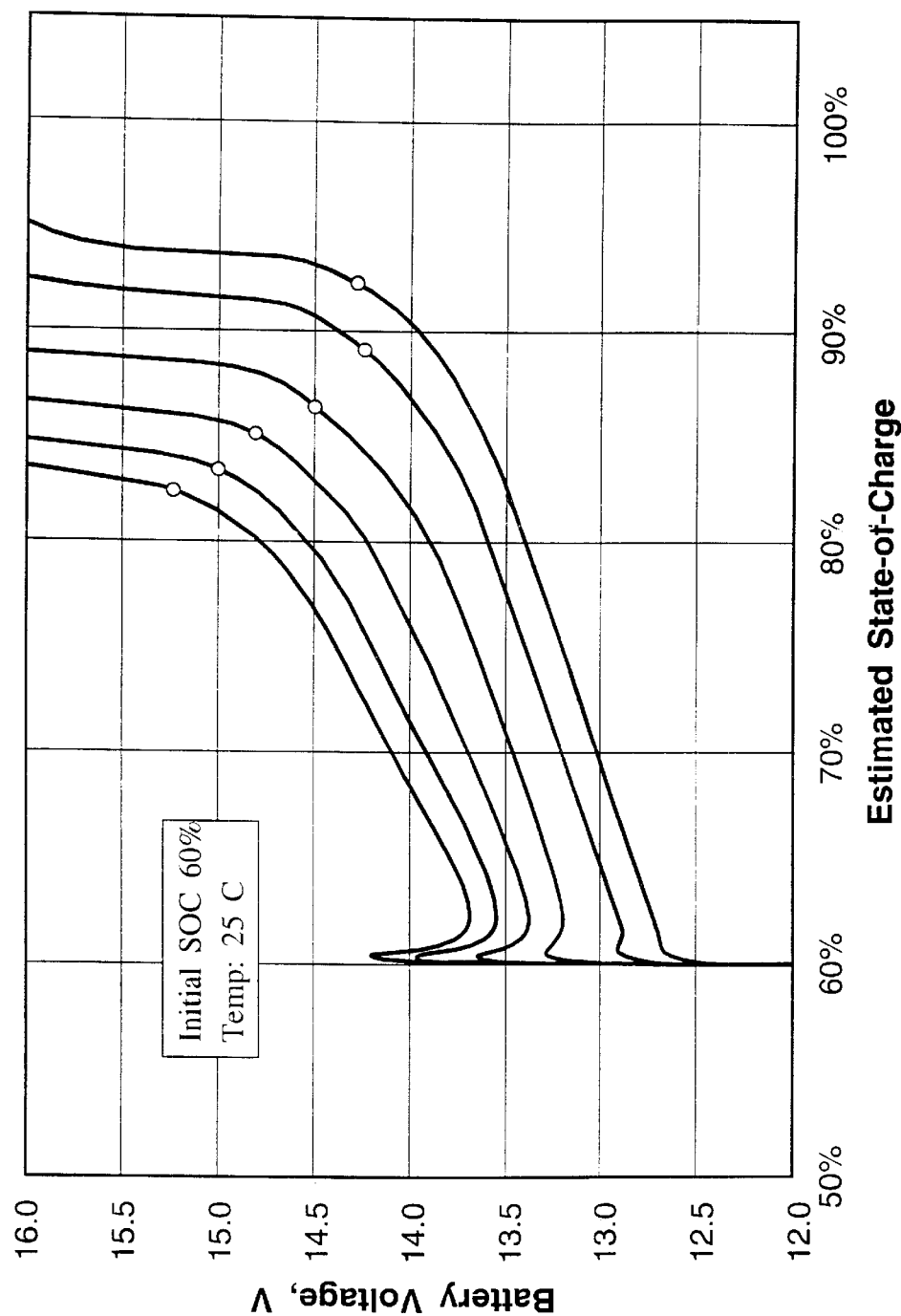
FIG. 16 is a graph illustrating the determination of the onset-of-overcharge for a series of charge current levels according to the present invention.
Figure 17:
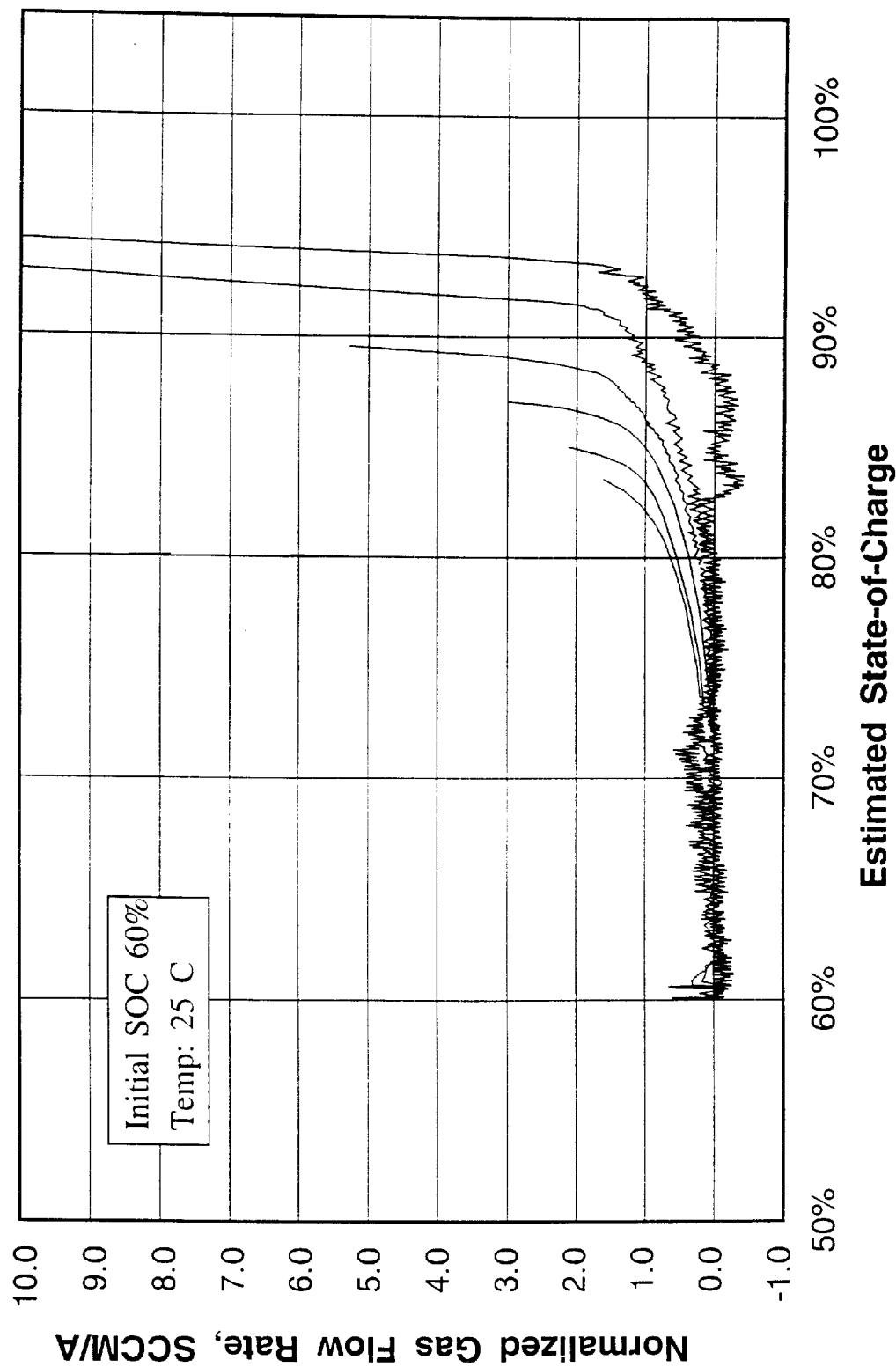
FIG. 17 is a graph of normalized gas-flow-rate as a function of estimated state-of-charge at a series of charge current levels.

In order to establish correct parameters relating to the described optimum charging method for a battery with a particular set of attributes, it is preferable to collect a set of empirical data under actual charging conditions. Experiments were conducted on a series of test batteries, such as Freedom® catalog number 1812, group 78, RC:115 and CCA:690 from Delphi Automotive Systems. The sample battery within each test was first charged to 100% SOC by a standard charge procedure and then discharged to a predetermined SOC level (60%, 70%, 80%, or 90%) by removing a calculated ampere-hour capacity at 3.45 A, or 20 HR discharge rate. After being allowed to reach temperature and voltage equilibrium in an eight to sixteen hour rest period, the battery was thereafter charged using a constant-current power source at the specified rate (test currents included 3.45 A, 7.5 A, 15 A, 25 A, 35 A, and 45 A). A high-speed data acquisition system recorded charging current, battery voltage, and gas flow rate from the vent ports during the test period. Upon reaching a specified maximum ampere-hour input or maximum gassing rate the charging was terminated. Representative charging profiles and gas flow rate graph derived from these tests are shown in FIG. 16 and FIG. 17. The charging profile of FIG. 16 illustrates charge initiation at 60% SOC at 25° C. for the group of charging currents. Onset of outgassing is indicated by the circles found along the voltage curves of FIG. 16. A corresponding graph of normalized gas flow at the six charging currents is shown in FIG. 17. Actual testing was performed at various conditions of initial SOC at both 25° C. and 50° C., and the results are summarized in Table 1 and Table 2. It was observed that the onset of outgassing occurs at nearly the same point of inflection on the corresponding voltage profile for all charging currents. Since it is known that the gassing reactions (i.e. hydrogen and oxygen evolution) are directly related to the level of current or electron input, a normalized gassing rate (SCCM per Amp) may be defined to render a beneficial comparison among the different charging rates. A critical gas flow rate of 1.0 SCCM/A was defined here as a critical state representing the maximum gassing rate allowed at any condition of charge rate, SOC, and temperature. The corresponding critical voltages for individual tests are summarized in Table 1. In Table 2, the outgassing data from the experiment was further reduced by arithmetic averaging, and divided into three ranges to exemplify a set of three charging regimes, specifically for low, nominal, and high levels of SOC, an example of which was previously described. The "upper charging voltage limit" given in Table 2 for low SOC levels (less than 80%) should theoretically be significantly above the stated value of 15.30 volts given for 25° C. and the value of 14.65 volts given for 50° C., however, these more limited values were employed so as to accommodate the electrical settings that are more preferable in typical vehicles. Nevertheless, a reduced voltage limit will not present significantly harmful effects to the battery service life; e.g., slight undercharge, or slight increase in charge time. In contrast, within the nominal charging regime the onset of outgassing occurs within a very narrow range of current and SOC level, so that an average or median point of these critical voltages must be selected to provide a driving current which provides some degree of balance between overcharging and undercharging.

Additionally, the onset-of-overcharge, or voltage-lid equation can be determined by monitoring the charge voltage gradient (dV/dQ) such that values which exceed a specified threshold level are evidence of the onset-of-overcharge condition. An example of a typical input-voltage change per-ampere-hour change threshold for a lead-acid battery is in the range of 150–250 mV/Ah (which may be alternatively given in relation to C-rate).

Batteries are generally maintained at fairly high SOC levels during the normal operation of a vehicle. The majority of overcharging and other service life degrading processes are often the result of excessive outgassing during "float charging" which stimulates gas evolution, internal heat, and similar undesirable processes. Consequently, the present invention provides a low voltage limit for the "float charge" that ensures a charging current level that does not exceed 3.45 amperes which maintains the gassing rate below the desired maximum of 1.0 SCCM/A or 3.45 SCCM.

An example follows which provides additional clarity in regard to the functioning of an approximation of the described optimum charging method:

(1) Critical voltage levels are determined:

Based on the collected data for the tested battery, the onset-of-overcharge potential as registered by the level of gassing during CI charging was found at a temperature of 25° C. to occur at 80% SOC for a charge current of 60 A, 85% SOC for a charge current of 45 A, and 90% SOC for a charge current of 3.45 A. Accordingly the corresponding onset-of-overcharge voltages are 15.3 V, 14.9 V, and 14.0V, respectively, as given by the average critical voltages of Table 2 for the three charging regimes.

Figure 5:
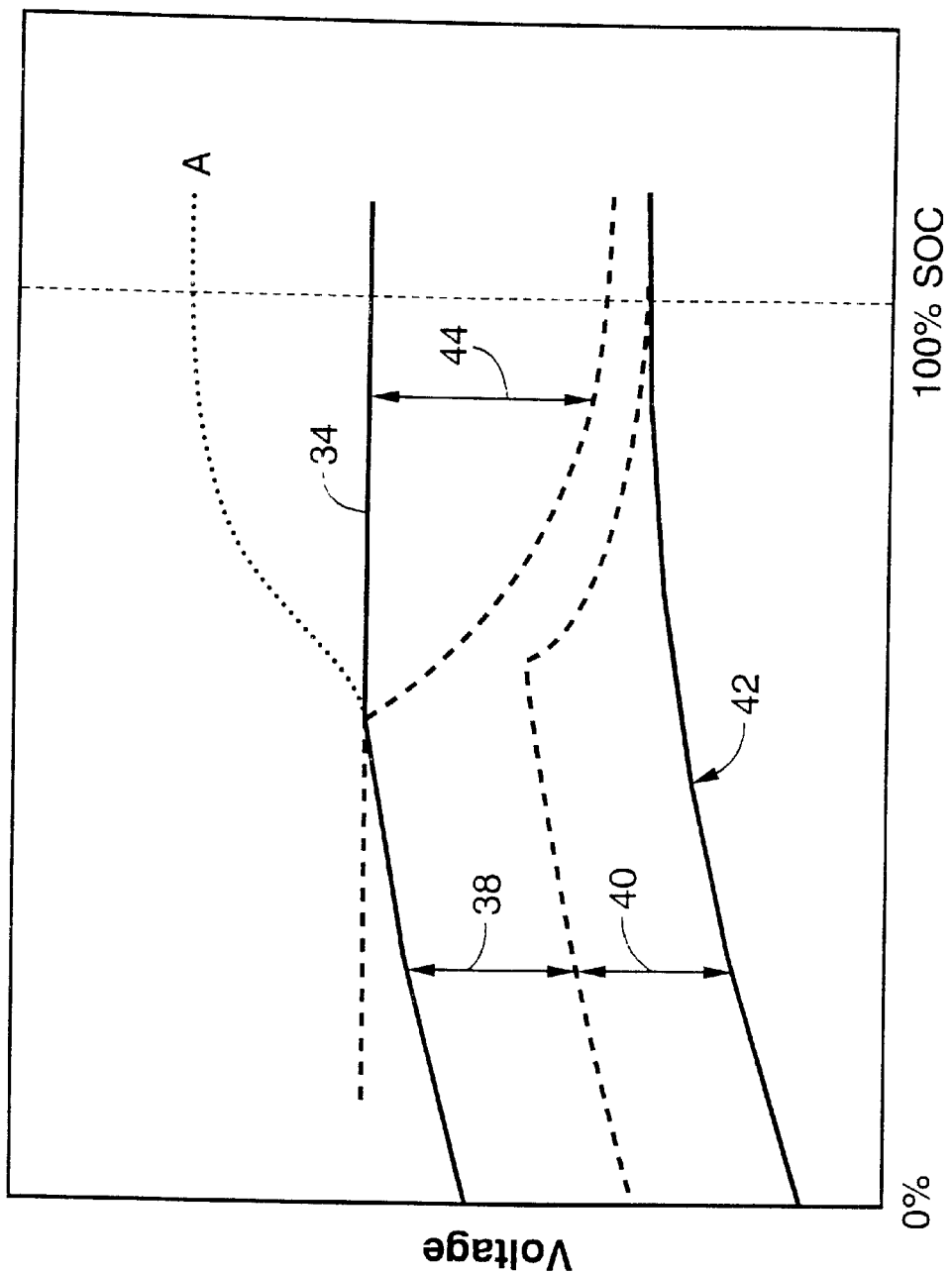
FIG. 5 is a graph of a charging voltage profile in relation to state-of-charge for a rapidly charged battery which is subject to a voltage limit which coincides with onset-of-overcharge for this charge current that moderates the applied charging current.
Figure 6:
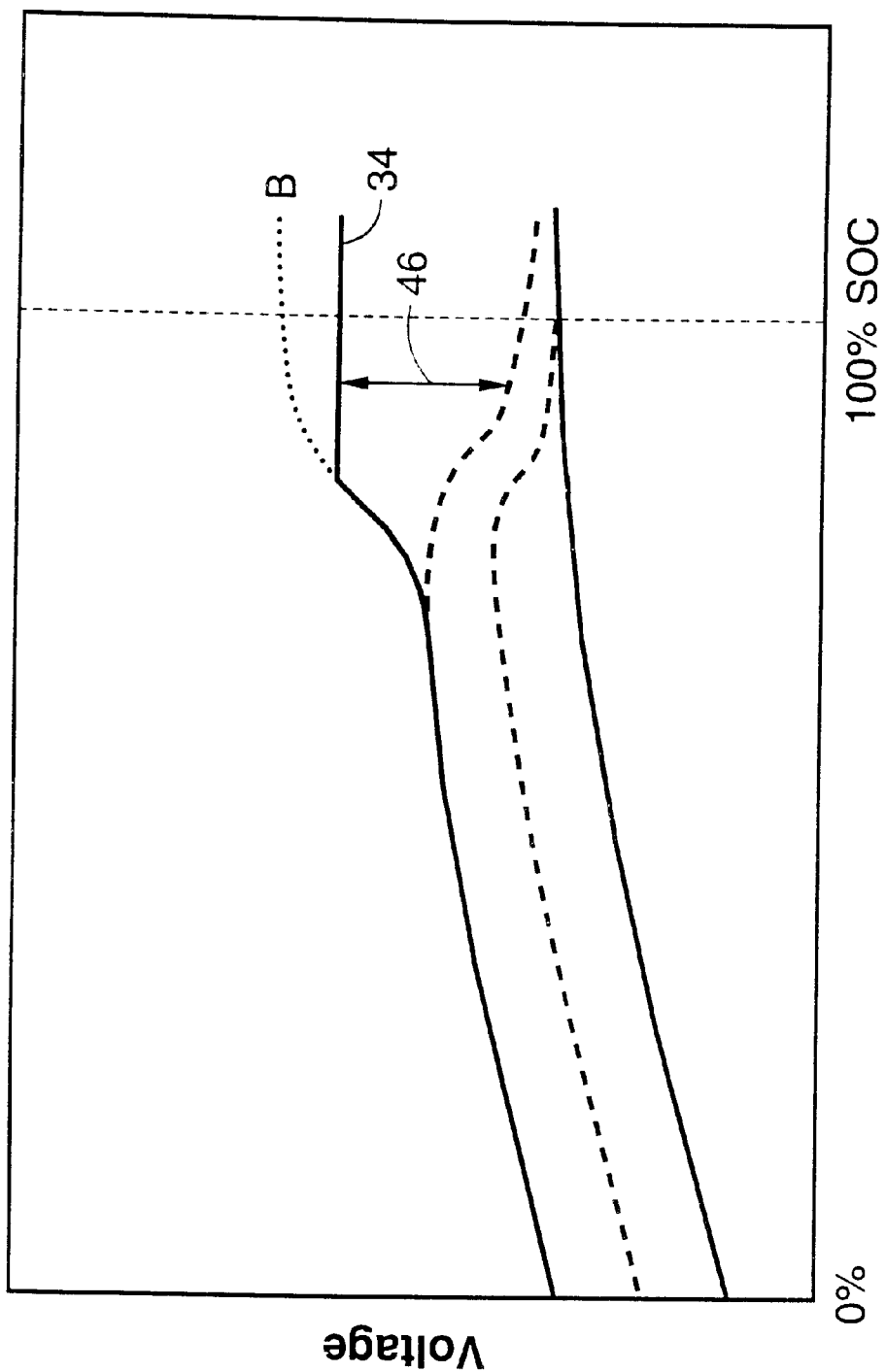
FIG. 6 is a graph of a charging voltage profile in relation to state-of-charge for a moderate rate of charge subject to the voltage limit of FIG. 5.
Figure 7:
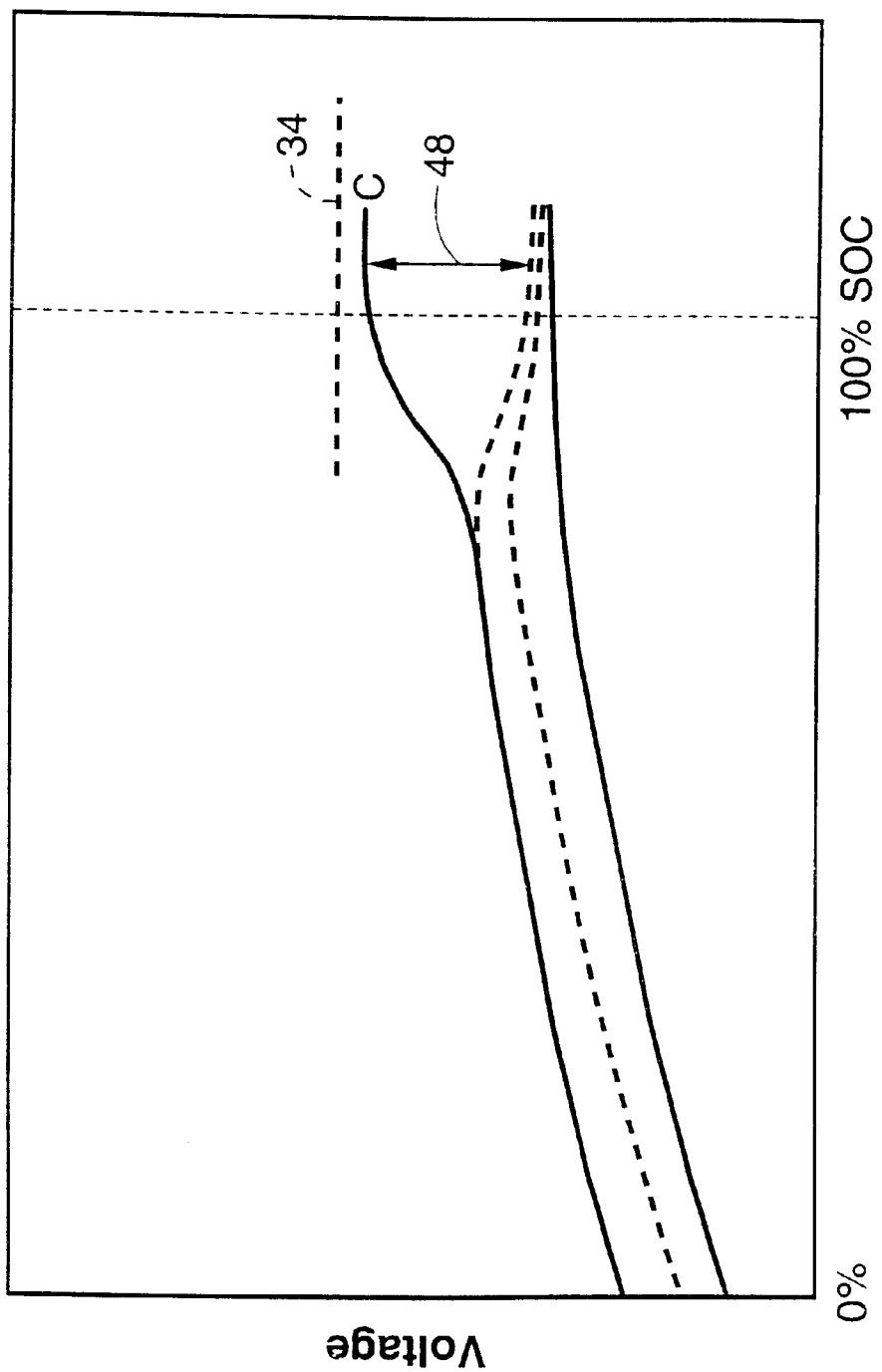
FIG. 7 is a graph of charging voltage in relation to state-of-charge for a low rate of charge subject to the voltage limit of FIG. 5.
Figure 8:
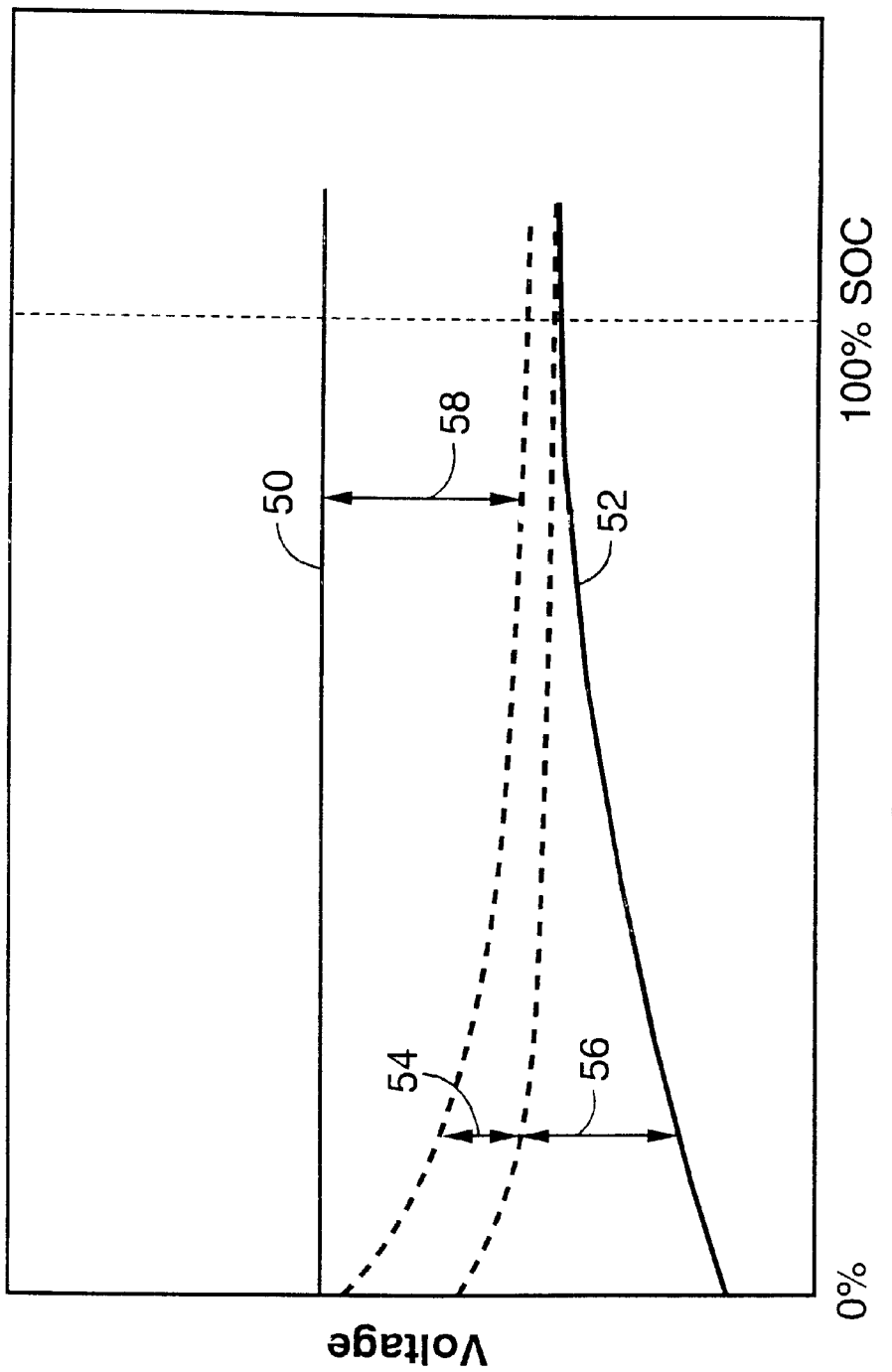
FIG. 8 is a graph of charging voltages in relation to state-of-charge for a hypothetical case of a "true" constant voltage charging method.
Figure 9:
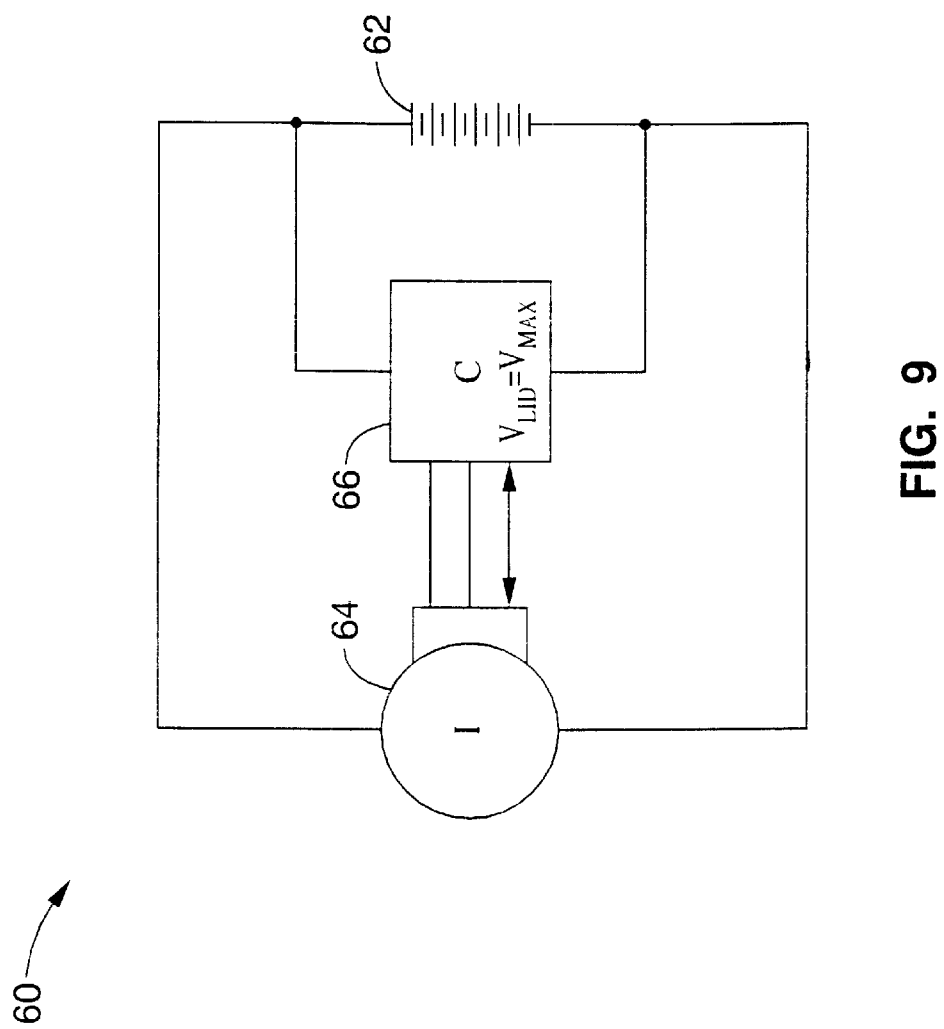
FIG. 9 is a simplified schematic of a typical charger having a control element such as utilized for stepped-current charging.

(2) High rate charge initiated at low SOC:

Having been determined from recorded operations that the battery is far below an 80% SOC level upon charge phase initiation, the charge system generates a high charging current regulated as a CI/CV charger of preferably 60 A or higher. The high current charging causes a rapid battery voltage rise toward the first critical voltage of 15.3 V. It should be appreciated that in a conventional CI/CV charging system, the charging current would be regulated freely to maintain the prescribed battery voltage until the battery is fully charged, as was described in reference to FIG. 5 through FIG. 7.

(3) High rate voltage lid prevents overcharge:

Charging current is automatically limited to 60 A or less by a voltage lid to eliminate any overcharging until the battery reaches an 80% SOC level. Any overcharge or inefficient charging thereby causes the charging current to regulate downward. This voltage limit is similar to that shown according to the illustration of in FIG. 5.

(4) Battery SOC level reaches a first threshold:

At an SOC level for the battery of 80%, which may be determined by ampere-hour integration or other equivalent methods, a new voltage limit of 14.9 V is assigned to quickly regulate the charging current to a level at or below 45 A, which satisfies the theoretical requirements to avoid overcharge potentials. In actuality, a slight amount of overcharging will occur as the SOC level for the battery increases above 85%, yet the effect would be minimal due to the use of a relatively low voltage limit of 14.9 V instead of the 15.3 V specified in Table 2 for the upper charging limit.

(5) Battery SOC level reaches a second threshold:

In a similarly manner, as the battery SOC level reaches 90%, a new voltage limit of 14.0V is assigned which forces a further charging current reduction to approximately 3.45 A. Beyond this 90% SOC level the battery is allowed to "float charge" at such a low voltage limit so as to assure a maximum charging current that does not exceed 3.45 A.

Although described for lead-acid batteries the described evaluation method may be generally applied to battery types having other chemistries, which include nickel-cadmium, nickel-metal-hydride, lithium-ion, along with additional nickel-based and lithium-based battery chemistries. One of ordinary skill will recognize that high-rate charging of NiMH batteries may generate excessive heat which may distort the voltage-lid function and since relaxation of NiMH is slow, charging of these cells above a 1.5C-rate is not typically recommended for present cell technology. Furthermore, voltage-lid function determination is slightly different for lithium-based cells since overcharging causes "parameterization" which destroys the cell (i.e. as a result of electrode micro-structure changes). Within lithium-based batteries the testing performed is destructive testing of the batteries, such that they are used only once, in the determination of the onset-of-overcharge conditions so that these conditions may be avoided within batteries subject to actual operating conditions.

Various methods have been described for employing variable voltage lids for battery charging according to the present invention. Although the implementation of the voltage lid method may vary widely a pair of procedure listings is given below as examples of both performing voltage lid calculations during operation and through the use of limited calculation or look-up tables during operation.

The following describes steps for use within a computer controlled charging environment which calculates the voltage lid on the fly.

(1) ... Determine initial SOC ... $\phi=\phi_0$
(2) ... Determine maximum current ... $\phi=\phi_{max}=(I_{max}/Q_N)$
(3) ... Charge at constant current ... $\phi$
(4) ... Update capacity increase ... $\phi=\phi+\phi\Delta\tau$
(5) ... Measure battery voltage ... $V_{BAT}$
(6) ... Calculate ideal battery voltage ... $V_{CALC}=v(\phi)+\beta\log(\phi)+\kappa\phi$
(7) ... Check voltage ... $V_{BAT} \geq V_{CALC}$
   IF {NO} goto Step 10
(8) ... Set new charging current ... $\phi=\phi\times\{fraction\}$
(9) ... Check current setting ... $\phi \geq \phi_{MIN} \rightarrow 0.0$
   IF {NO} goto Step 11
(10) ... Repeat Steps 3 through 7
(11) ... End Test In the following variation, a set of values are stored which are retrieved during operation for determining the voltage lid.

Figure 10:
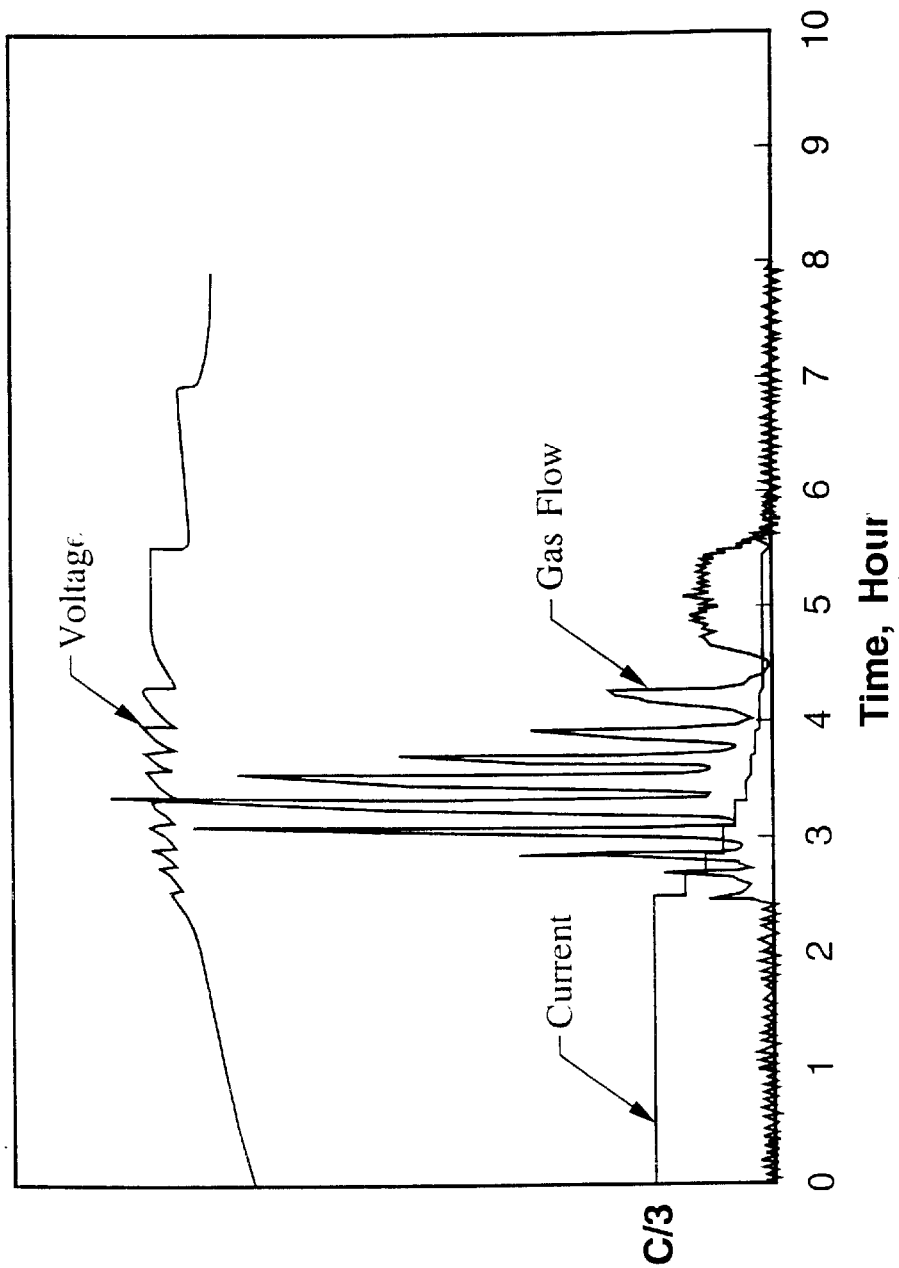
FIG. 10 is a graph of voltage, current, and gas flow rate overtime within a current stepped charging system.
Figure 11:
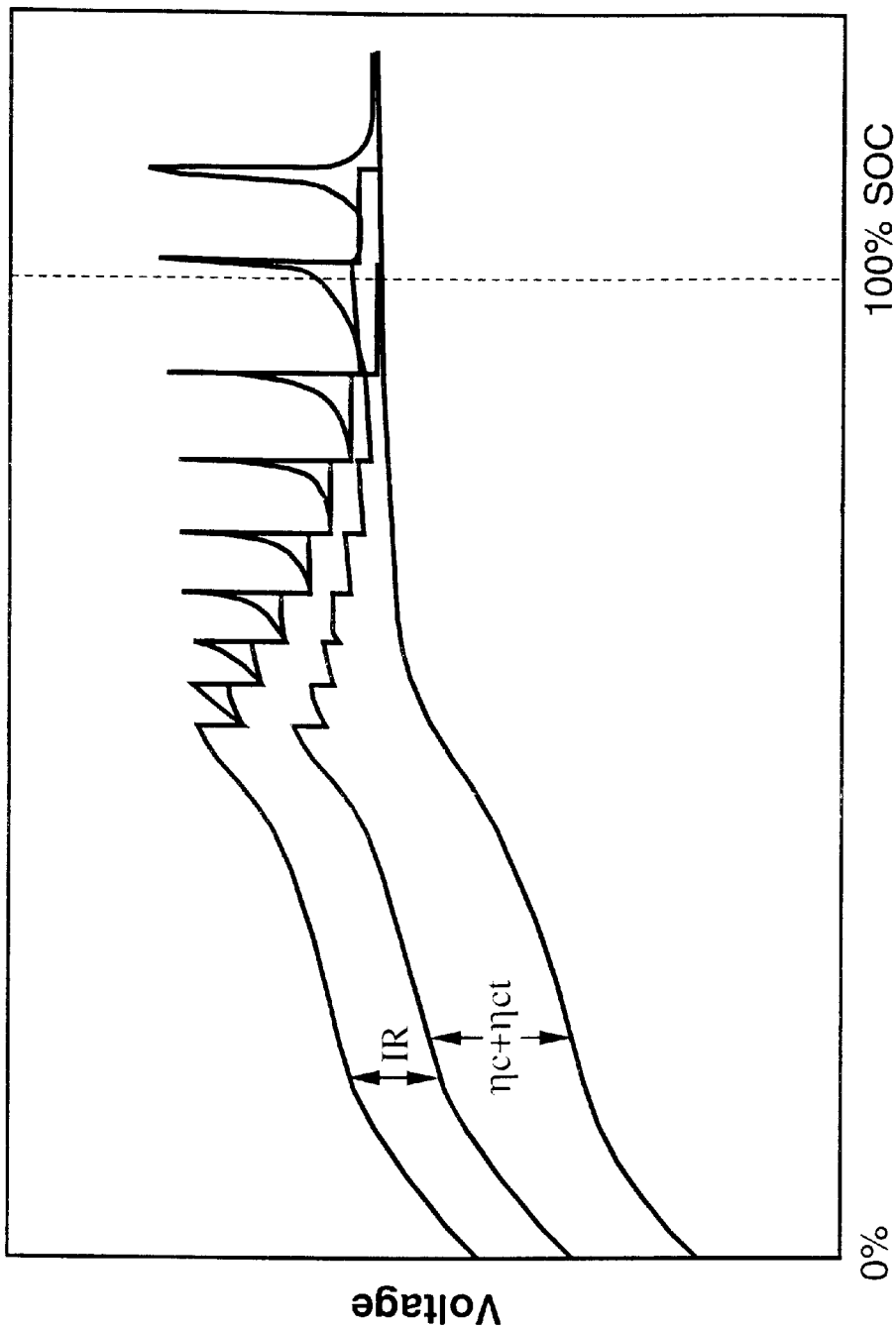
FIG. 11 is a graph of charging voltage as a function of state-of-charge associated with the stepped current charging shown in FIG. 10.
Figure 18:
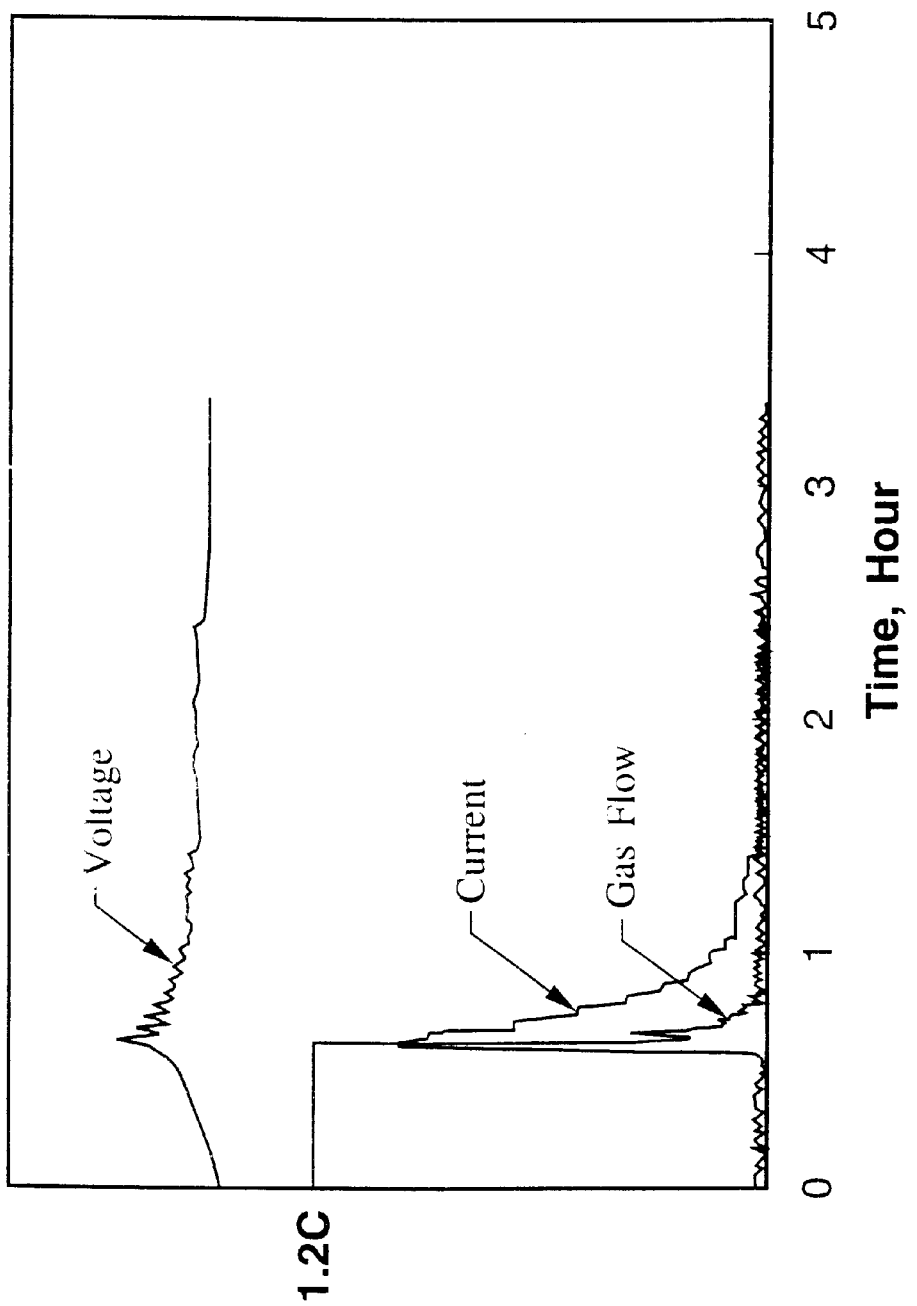
FIG. 18 is a graph of voltage, current, and gas flow rate over time for the variable voltage-lid method of charging according to an embodiment of the present invention.
Figure 19:
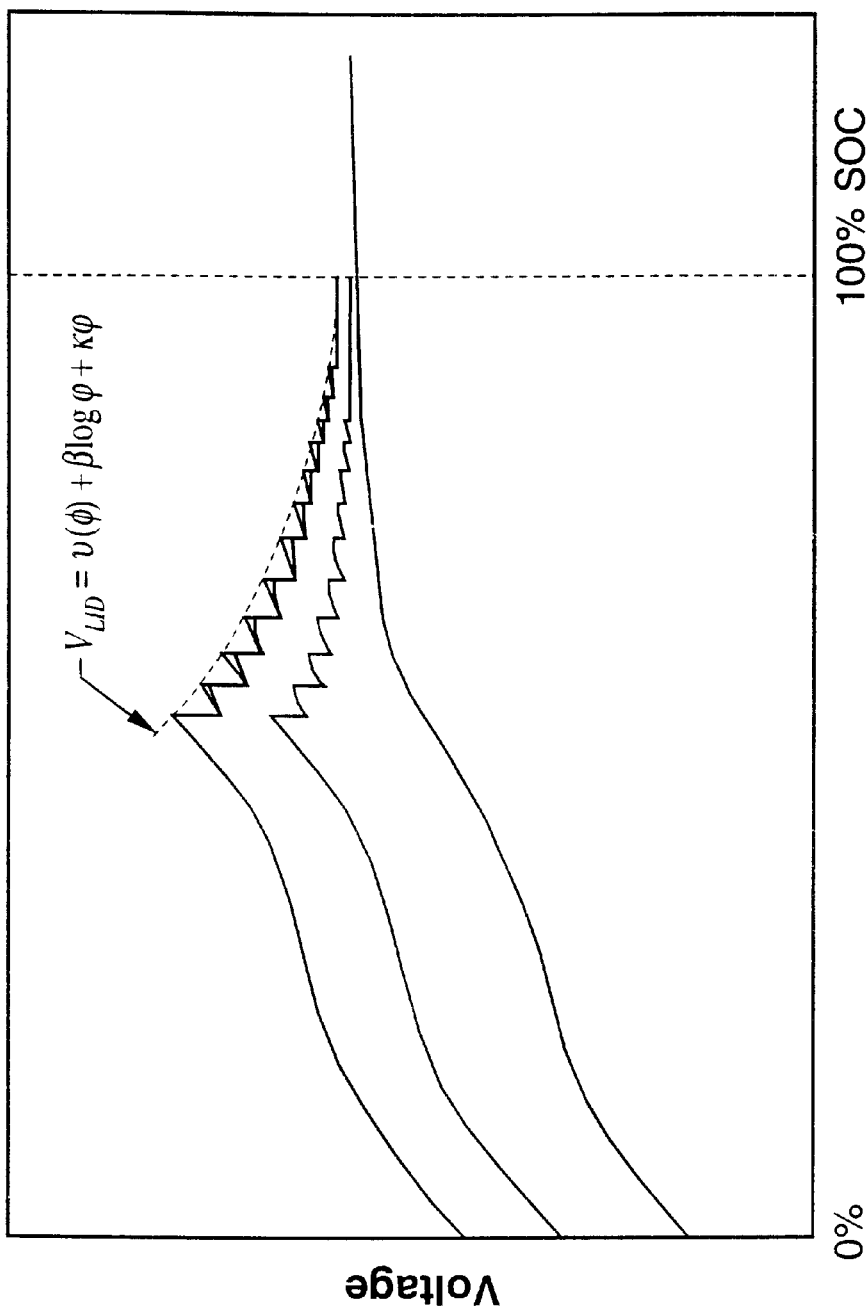
FIG. 19 is a graph of charging voltage as a function of state-of-charge associated with the multiple voltage-lid charging which is shown in FIG. 18.

(1) ... Determine maximum current ... $\phi=\phi_{max}=(I_{max}/Q_N)$
(2) ... Estimate onset SOC at $\phi_{max}$ ... $\phi_0$
(3) ... Define charging profile
   Define current stepping profile ... $\phi_1=\phi_0\{fraction\}$
   ... $\phi_2=\phi_1\times\{fraction\}$
   ... $\phi_3=\phi_2\times\{fraction\}$
   ... etc.
   Determine number of steps ... $N=\{\phi_j \rightarrow \phi_{MIN}\}$
   Calculate expected $\Delta\phi$ ... $\Delta\phi=(1-\phi_0)/N$
   Define subsets $(\phi_j,\phi_j)$ ... $(\phi_1,\phi_1=\phi_0+\Delta\phi)$
   ... $(\phi_2,\phi_2=\phi_1+\Delta\phi)$
   ... $(\phi_3,\phi_3=\phi_2+\Delta\phi)$
   ... etc.
   Calculate expected ideal voltage ... $V_o=v(\phi_0)+\beta\log(\phi_0)+\kappa\phi_0$
   ... $V_1=v(\phi_1)+\beta\log(\phi_1)+\kappa\phi_1$
   ... $V_2=v(\phi_2)+\beta\log(\phi_2)+\kappa\phi_2$
   ... etc.
(4) ... Set initial charging current (j=0) ... $\phi=\phi_0$
(5) ... Set voltage lid ... $V_{LID}=V_0$
(6) ... Charge at constant current ... $\phi$
(7) ... Measure battery voltage ... $V_{BAT}$
(8) ... Check voltage ... $V_{BAT} \geq V_{LID}$
   IF {NO} goto Step 12
(9) ... Check new charging current (j =j +1) ... $\phi=\phi_j$
(10) ... Set new voltage lid ... $V_{LID}=V_j$
(11) ... Repeat Steps 6 through 8
(12) ... End Test It will be appreciated from the foregoing embodiments of the invention that the variable voltage lid method according to the invention may be implemented in various ways and approximations without departing from the inventive teachings. The inventive method was tested under laboratory conditions to ascertain the level of optimization which could be provided. The embodiment of the charging method utilized within the test employed an optimal variable voltage lid to limit charging from a charger providing a stepped-current function that was applied such that the number and size of current steps determined the degree of matching between the actual battery charging profile and the optimum theoretical charge curve. The results of the tests are shown in FIG. 18 and FIG. 19 and can be compared with the stepped-current test results of FIG. 10 and FIG. 11, as these tests were performed under identical conditions. FIG. 18 is the charging profile obtained during testing of that aspect of the present invention and it provides a close approximation of the optimum charging profile that was described in reference to FIG. 13. Under high-current charging conditions at low SOC, the estimated voltage lid was high to reflect the large current-induced polarization effects. The voltage lid subsequently was reduced gradually in a continuous manner to match the charge acceptance dynamics of the battery. In agreement with the theoretical optimum conditions, the set-point voltage lid and measured battery voltage approximated the open-circuit voltage of a fully charged battery upon completion of the charging cycle.

In comparing the inventive method associated with FIG. 18 and FIG. 19 to the stepped current profile method, it should be appreciated that overcharging and gassing reactions at any level of SOC for the inventive method was far superior to the stepped-current method and was observed to be nearly eliminated (ampere-hour integration data indicates levels of overcharge in the 2%–5% range). These results are especially significant in view of the four-fold increase in the initial charging current that was applied in testing the inventive methods against the stepped-current method. The overall charge time for the battery was significantly reduced from a period of 5 to 7 hours for the stepped-current system to a period of 1.5 to 2.5 hours for the system according to the invention. A total of fifteen charge-discharge cycles were performed during the testing and no degradation in performance or loss of capacity for the batteries was detected. The exemplified three and five stage voltage limits were not similarly tested in the laboratory.

It will be recognized that actual battery operating conditions within a vehicle are difficult to duplicate in the laboratory and it should be appreciated that under normal testing conditions the batteries achieve steady state charging rapidly, especially with flooded-type batteries, and regulate quickly into the "float charge" regime as they near full charge due to the narrow transition window. A considerably more extensive laboratory procedure is necessary to examine the optimal functionality under conditions wherein a dynamic current load level and maximum charger supply current are provided to simulate, for example, a city driving environment of stopping and going.

To assure operation under dynamic charge/discharge conditions, wherein various load currents are drawn from the battery, the charging method was tested within a vehicle under actual city-driving conditions on two consecutive summer days. The test yielded data that in summary support the expected value of the inventive charging method for providing rapid charging with minimal overcharging. At the commencement of testing the battery had received a partial charge to an 80% SOC level. Battery charging at low SOC level below 80% were completed rapidly at high inrush currents in the range from 60–80 amps while current regulation began at a relatively high voltage limit. As the battery approached the full-charge state, both the charging current and voltage limit were regulated (or stepped) down according to the invention which minimized overcharging. The measured gas flow rate indicated that a low gassing level was maintained thereby agreeing with the model and providing an indicator of the degree of overcharge during a recharge cycle.

During these driving tests, the calculated SOC level for the battery increased to above 100% in less than an hour, and maintained this high level for the remaining time. As a consequence of employing the inventive method, improved fuel efficiency may be achieved by lowering the generator output requirement so that the battery life can be significantly extended by operating continuously at a relatively high SOC level while being subjected to only meager levels of overcharging. The end-of-test SOC level for the battery was confirmed by measuring the 20 HR discharge.

Accordingly, it will be seen that this invention teaches methods for optimizing the charging of batteries by employing a decreasing variable voltage lid function modeled upon a set of battery charging parameters. The methods of charging have been described in reference to an automotive application wherein highly dynamic conditions prevail. It should be recognized that the charging methods may be employed within a variety of chargers which are capable of charging an assortment of batteries of varying chemistry. In addition, the methods are described according to an example in which charging parameters were determined empirically for a particular battery, however, the methods taught are generally applicable despite the process used for collecting battery parameters and toward their applicability within a given formula. The inventive teachings describe alternative methods, such as step-wise, or ranging, implementation of the present inventive methods and one of ordinary skill in the art will recognize that numerous additional variations may be implemented without creative effort.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Critical Charging Voltage as a Function of Current and SOC

| Initial SOC | Amperes | Temperature 25° C. | | 50° C. | |
|---|---|---|---|---|---|
| | | % SOC | VOLT | % SOC | VOLT |
| 60.0% | 3.45 | 92.2 | 14.267 | 81.0 | 13.300 |
| | 7.5 | 89.1 | 14.245 | 86.2 | 13.676 |
| | 15 | 86.5 | 14.510 | 86.3 | 14.001 |
| | 25 | 85.1 | 14.818 | 85.9 | 14.305 |
| | 35 | 83.4 | 15.003 | 84.2 | 14.415 |
| | 45 | 82.4 | 15.232 | 83.1 | 14.528 |
| 70.0% | 3.45 | 89.0 | 13.729 | 86.5 | 13.338 |
| | 7.5 | 90.6 | 14.152 | 88.8 | 13.666 |
| | 15 | 89.3 | 14.560 | 89.2 | 14.017 |
| | 25 | 87.7 | 14.758 | 88.1 | 14.249 |
| | 35 | 86.9 | 15.049 | 86.9 | 14.403 |
| | 45 | 85.7 | 15.197 | 85.6 | 14.521 |
| 80.0% | 3.45 | 93.0 | 13.910 | 92.0 | 13.392 |
| | 7.5 | 91.7 | 14.113 | 90.5 | 13.680 |
| | 15 | 91.1 | 14.540 | 90.5 | 14.011 |
| | 25 | 89.8 | 14.794 | 89.7 | 14.299 |
| | 35 | 88.7 | 14.967 | 88.8 | 14.492 |
| | 45 | 88.1 | 15.232 | 87.9 | 14.649 |
| 90.0% | 3.45 | 94.9 | 13.908 | 95.5 | 13.422 |
| | 7.5 | 94.6 | 14.180 | 93.2 | 13.782 |
| | 15 | 94.2 | 14.681 | 93.1 | 14.086 |
| | 25 | 93.0 | 14.830 | 92.7 | 14.439 |
| | 35 | 92.7 | 15.147 | 92.3 | 14.690 |
| | 45 | 92.4 | 15.433 | 92.0 | 14.908 |

TABLE 2

Summary of Averaged Critical Charging Voltage

| Charge Amps | Gassing Voltage, V at 25° C. | at 50° C. | |
|---|---|---|---|
| 3.45 | 14.00 | 13.50 | Float Charging Voltage |
| 7.5 | 14.17 | 13.70 | |
| 15 | 14.57 | 14.03 | Nominal Charging Voltage |
| 25 | 14.90 | 14.40 | |
| 35 | 15.04 | 14.50 | Upper Charging Voltage |
| 45 | 15.30 | 14.65 | |

What is claimed is:

1. A method of charging a battery, comprising:

(a) applying a controlled level of current to the battery; and (b) modulating current applied to the battery wherein the resultant charge voltage applied to the battery is downwardly modulated in response to an onset-of-overcharging condition and wherein the amount of overcharging potential to which the battery is subjected is limited.

2. A method of charging a battery, comprising:

(a) supplying a charging current to a battery;

(b) detecting an onset-of-overcharge condition as the battery is supplied with said charging current; and (c) decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited.

3. A method as recited in claim 2, further comprising supplying charge current to the battery from a controllable current source that forces current through a series resistance, said series resistance comprising the current source and the battery being charged.

4. A method as recited in claim 2, further comprising supplying the charge current to the battery at a constant rate and limiting the charger current by a maximum voltage lid.

5. A method as recited in claim 2, further comprising providing a stepwise current output that controlled according to the voltage lid.

6. A method as recited in claim 2, further comprising detecting the onset-of-overcharge at a predetermined level of SOC in relation to the applied current.

7. A method as recited in claim 6, further comprising empirically determining a relationship between the onset-of-overcharge and the SOC as a function of applied current and temperature.

8. A method as recited in claim 2, further comprising detecting the level of outgassing of the battery and determining the onset-of-overcharge by the level of detected outgassing.

9. A method as recited in claim 2, wherein the voltage lid is a function of battery state-of-charge given by $V_{LID} = v(\phi) + \beta \log \phi + \kappa \phi$.

10. A method as recited in claim 9, further comprising approximating the voltage lid by a series of discrete steps having a step size determined by the degree of matching required by the level of overcharging to be allowed within a particular application.

11. A method as recited in claim 10, further comprising providing at least three steps in which maximum fixed voltages are applied to battery charging, the three steps being defined within an associated three ranges of state-of-charge.

12. A method as recited in claim 2, further comprising approximating the voltage lid by functions representing similar response profiles which decrease as the state-of-charge progresses, and determining a degree of function matching by the level of overcharging to be allowed within a particular application.

13. A method as recited in claim 2, further comprising determining the voltage lid by reaching a normalized maximum gassing rate attained during charging of the battery.

14. A method as recited in claim 13, further comprising setting the normalized maximum gassing rate to approximately 1.0 SCCM/A during charging.

15. A method as recited in claim 2, further comprising determining the voltage lid by reaching a constant voltage gradient dV/dQ wherein the voltage per ampere-hour exceeds a specified threshold during charging of the battery.

16. A method as recited in claim 2, further comprising charging a battery selected from the group of batteries consisting of lead-acid, nickel-cadmium, nickel-metal-hydride, lithium-ion, nickel-based, and lithium-based.

17. A method as recited in claim 2, further comprising applying a high battery charging rate exceeding 1.2C to a battery whose state-of-charge is sufficiently low as not to be subject to an onset-of-overcharge condition which allows initial charging to proceed rapidly.

18. A method of charging a battery, comprising the steps of:

(a) applying charging current to the battery at a controlled level limited by a voltage lid;

(b) detecting an onset-of-overcharge condition while charging at the existing level of charge current;

(c) reducing the voltage lid as a result of the detected onset-of-overcharge condition to limit the current applied to the battery and the overcharge potential; and (d) repeating steps (b) and (c) until the applied current to the battery has been limited to a sufficiently low level to constitute a desired "float charge".

19. A method as recited in claim 18, further comprising estimating the onset-of-overcharge condition detection according to the conditions of SOC, applied current and temperature.

20. A method as recited in claim 18, further comprising detecting outgassing of the battery and determining the onset-of-overcharge condition by the level of detected outgassing which occurs.

21. A method as recited in claim 18, further comprising providing a stepwise current output that is controlled according to the voltage lid.

22. An apparatus for charging a battery, comprising:
(a) means for applying a controlled level of current to the battery; and
(b) means for modulating current applied to the battery wherein the resultant charge voltage applied to the battery is downwardly modulated in response to an onset-of-overcharging condition and wherein the amount of overcharging potential to which the battery is subjected is limited.

23. An apparatus for charging a battery, comprising:
(a) means for supplying a charging current to a battery;
(b) means for detecting an onset-of-overcharge condition as the battery is supplied with said charging current; and
(c) means for decreasing the maximum charge voltage being applied to said battery upon detection of the onset-of-overcharge condition, wherein said charging current is subjected to a voltage lid that decreases as the state-of-charge progresses, so as to limit the overcharge potentials to which the battery is subjected.

24. An apparatus as recited in claim 23, wherein the charge current is supplied to the battery from a controllable current source that forces current through a series resistance, said series resistance comprising the voltage source and the battery being charged.

25. An apparatus as recited in claim 23, wherein the charge current is supplied to the battery at a constant rate and is limited by a maximum voltage lid.

26. An apparatus as recited in claim 23, further comprising means for providing stepwise current output controlled according to the voltage lid.

27. An apparatus as recited in claim 23, wherein the onset-of-overcharge is detected at a predetermined level of SOC in relation to the applied current.

28. An apparatus as recited in claim 27, wherein an empirical relationship between the onset-of-overcharge and the SOC is empirically determined in relation to parameters comprising applied current and temperature.

29. An apparatus as recited in claim 23, further comprising means for detecting outgassing of the battery and wherein the onset-of-overcharge is determined by the level of detected outgassing.

30. An apparatus as recited in claim 23, wherein the voltage lid is a function of battery state-of-charge given by $V_{LID} = v(\phi) + \beta \log \phi + \kappa \phi$.

31. An apparatus as recited in claim 30, wherein the voltage lid is approximated by a series of discrete steps having a step size determined by a degree of matching required by the level of overcharging to be allowed within a particular application.

32. An apparatus as recited in claim 31, wherein at least three steps are provided in which maximum fixed voltages are applied to battery charging, the three steps being defined within an associated three ranges of state-of-charge.

33. An apparatus as recited in claim 23, wherein the voltage lid is approximated by functions representing similar response profiles which decrease as the state-of-charge progresses, with a degree of function matching being determined by the level of overcharging to be allowed within a particular application.

34. An apparatus as recited in claim 23, wherein the voltage lid is determined by reaching a normalized maximum gassing rate attained during charging of the battery.

35. An apparatus as recited in claim 34, wherein the normalized maximum gassing rate is set to approximately 1.0 SCCM/A during charging.

36. An apparatus as recited in claim 23, wherein the voltage lid is determined by reaching a constant voltage gradient dV/dQ wherein the voltage per ampere-hour exceeds a specified threshold during charging of the battery.

37. An apparatus as recited in claim 23, wherein the battery charges is selected from the group of batteries consisting of lead-acid, nickel-cadmium, nickel-metal-hydride, lithium-ion, nickel-based, and lithium-based.

38. An apparatus as recited in claim 23, wherein said apparatus is configured for a high battery charging rate exceeding 1.2C for a battery whose state-of-charge is sufficiently low as not to be subject to an onset-of-overcharge condition which allows initial charging to proceed rapidly.

39. An apparatus for charging a battery, comprising:
(a) means for applying charging current to the battery at a controlled level limited by a voltage lid;
(b) means for detecting an onset-of-overcharge condition while charging at the existing level of charge current;
(c) means for reducing the voltage lid as a result of the detected onset-of-overcharge condition to limit the current applied to the battery and the overcharge potential; and
(d) means for limiting the applied current to the battery to a sufficiently low level to constitute a desired "float charge".

40. An apparatus as recited in claim 39, wherein the onset-of-overcharge condition detection is estimated according to the conditions of SOC, applied current and temperature.

41. An apparatus as recited in claim 39, further comprising means for detecting outgassing of the battery, and wherein the onset-of-overcharge condition is determined by the level of detected outgassing which occurs.

42. An apparatus as recited in claim 39, further comprising means for providing stepwise current output controlled according to the voltage lid.

43. A method of charging a battery, comprising:
supplying a charging current to a battery from a controllable current source that forces current through a series resistance, said series resistance comprising the current source and the battery being charged;
detecting an onset-of-overcharge condition as the battery is supplied with said charging current; and
decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited.

44. A method of charging a battery, comprising:
supplying a charging current to a battery;
detecting an onset-of-overcharge condition as the battery is supplied with said charging current;
decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and wherein charge current is supplied to the battery at a constant rate which is limited by a maximum set by said voltage lid.

45. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and wherein a stepwise current output is provided which is controlled according to said voltage lid.

46. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and detecting the level of outgassing of the battery and determining the onset-of-overcharge by the level of detected outgassing.

47. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and wherein said voltage lid is a function of battery state-of-charge given by $V_{LID} = v\phi + \beta \log \phi + \kappa \phi$.

48. A method as recited in claim 47, further comprising setting the normalized maximum gassing rate to approximately 1.0 SCCM/A during charging.

49. A method as recited in claim 48, further comprising providing at least three steps in which maximum fixed voltages are applied to battery charging, the three steps being defined within an associated three ranges of state-of-charge.

50. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and approximating the voltage lid by functions representing similar response profiles which decrease as the state-of-charge progresses, and determining a degree of function matching by the level of overcharging to be allowed within a particular application.

51. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and determining said voltage lid by reaching a normalized maximum gassing rate attained during charging of the battery.

52. A method as recited in claim 51, further comprising setting the normalized maximum gassing rate to approximately 1.0 SCCM/A during charging.

53. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and determining said voltage lid by reaching a constant voltage gradient dV/dQ wherein the voltage per ampere-hour exceeds a specified threshold during charging of the battery.

54. A method of charging a battery, comprising:

supplying a charging current to a battery;

detecting an onset-of-overcharge condition as the battery is supplied with said charging current;

decreasing the maximum charge voltage being applied to said battery upon detection of the onset-of-overcharge condition, wherein said charging current is subjected to a voltage lid that decreases as the state-of-charge progresses, and wherein the overcharge potentials to which the battery is subjected are limited; and wherein said charging current is supplied as a high charging rate exceeding 1.2C to said battery when its state-of-charge is sufficiently low as not to be subject to an onset-of-overcharge condition which allows initial charging to proceed rapidly.

55. A method of charging a battery, comprising the steps of:

applying a stepwise charging current output to the battery at a controlled level limited according to a voltage lid;

detecting an onset-of-overcharge condition while charging at the existing level of charge current;

reducing the voltage lid as a result of the detected onset-of-overcharge condition to limit the current applied to the battery and the overcharge potential; and repeating the above two steps until the applied current to the battery has been limited to a sufficiently low level to constitute a desired "float charge".

56. An apparatus for charging a battery, comprising:

means for supplying a charging current to a battery from a controllable current source that forces current through a series resistance, said series resistance comprising the voltage source and the battery being charged;

means for detecting an onset-of-overcharge condition as the battery is supplied with said charging current; and means for decreasing the maximum charge voltage being applied to said battery upon detection of the onset-of-overcharge condition, wherein said charging current is subjected to a voltage lid that decreases as the state-of-charge progresses, so as to limit the overcharge potentials to which the battery is subjected.

57. An apparatus for charging a battery, comprising:

means for supplying a charging current to a battery at a constant rate which is limited by a maximum voltage lid;

means for detecting an onset-of-overcharge condition as the battery is supplied with said charging current; and means for decreasing the maximum charge voltage being applied to said battery upon detection of the onset-of-overcharge condition, wherein said charging current is subjected to a voltage lid that decreases as the state-of-charge progresses, so as to limit the overcharge potentials to which the battery is subjected.

58. An apparatus for charging a battery, comprising:

means for supplying a charging current to a battery as a stepwise current output controlled according to the voltage lid;

means for detecting an onset-of-overcharge condition as the battery is supplied with said charging current; and means for decreasing the maximum charge voltage being applied to said battery upon detection of the onset-of-overcharge condition, wherein said charging current is subjected to a voltage lid that decreases as the state-of-charge progresses, so as to limit the overcharge potentials to which the battery is subjected.

59. An apparatus for charging a battery, comprising:

means for supplying a charging current to a battery;

means for detecting an onset-of-overcharge condition as the battery is supplied with said charging current;

means for decreasing the maximum charge voltage being applied to said battery upon detection of the onset-of-overcharge condition, wherein said charging current is subjected to a voltage lid that decreases as the state-of-charge progresses, so as to limit the overcharge potentials to which the battery is subjected; and means for detecting outgassing of the battery and wherein the onset-of-overcharge is determined by the level of detected outgassing.

60. An apparatus for charging a battery, comprising:

means for supplying a charging current to a battery;

means for detecting an onset-of-overcharge condition as the battery is supplied with said charging current; and means for decreasing the maximum charge voltage being applied to said battery upon detection of the onset-of-overcharge condition;

wherein said charging current is subjected to a voltage lid that decreases as the state-of-charge progresses, so as to limit the overcharge potentials to which the battery is subjected.

wherein the voltage lid is a function of battery state-of-charge given by $V_{LID}=\nu\phi+\beta\log\phi+\kappa\phi$.

61. An apparatus as recited in claim 60, wherein said voltage lid is approximated by a series of discrete steps having a step size determined by a degree of matching required by the level of overcharging to be allowed within a particular application.

62. An apparatus as recited in claim 61, wherein at least three steps are provided in which maximum fixed voltages are applied to said battery charging, the three steps being defined within an associated three ranges of state-of-charge.

63. An apparatus for charging a battery, comprising:

means for supplying a charging current to a battery;

means for detecting an onset-of-overcharge condition as the battery is supplied with said charging current; and means for decreasing the maximum charge voltage being applied to said battery according to a voltage lid upon detection of the onset-of-overcharge condition;

wherein said voltage lid decreases as the state-of-charge progresses, so as to limit the overcharge potentials to which the battery is subjected;

wherein said voltage lid is approximated by functions representing similar response profiles which decrease as the state-of-charge progresses, with a degree of function matching being determined by the level of overcharging to be allowed within a particular application.

64. An apparatus for charging a battery, comprising:

means for supplying a charging current to a battery;

means for detecting an onset-of-overcharge condition as the battery is supplied with said charging current; and means for decreasing the maximum charge voltage being applied to said battery according to a voltage lid upon detection of the onset-of-overcharge condition;

wherein said voltage lid decreases as the state-of-charge progresses, so as to limit the overcharge potentials to which the battery is subjected;

wherein the voltage lid is determined by reaching a normalized maximum gassing rate attained during charging of the battery.

65. An apparatus as recited in claim 64, wherein said normalized maximum gassing rate is set to approximately 1.0 SCCM/A during charging.

66. An apparatus for charging a battery, comprising:

means for supplying a charging current to a battery;

means for detecting an onset-of-overcharge condition as the battery is supplied with said charging current; and means for decreasing the maximum charge voltage being applied to said battery according to a voltage lid upon detection of the onset-of-overcharge condition;

wherein said voltage lid decreases as the state-of-charge progresses, so as to limit the overcharge potentials to which the battery is subjected;

wherein said voltage lid is determined by reaching a constant voltage gradient dV/dQ wherein the voltage per ampere-hour exceeds a specified threshold during said charging of the battery.

67. An apparatus for charging a battery, comprising:

means for supplying a charging current to a battery;

means for detecting an onset-of-overcharge condition as the battery is supplied with said charging current; and means for decreasing the maximum charge voltage being applied to said battery according to a voltage lid upon detection of the onset-of-overcharge condition;

wherein said voltage lid decreases as the state-of-charge progresses, so as to limit the overcharge potentials to which the battery is subjected;

wherein said apparatus is configured for a high battery charging rate exceeding 1.2C for a battery whose state-of-charge is sufficiently low as not to be subject to an onset-of-overcharge condition which allows initial charging to proceed rapidly.

68. An apparatus for charging a battery, comprising:

means for applying charging current to the battery at a controlled level limited by a voltage lid;

means for detecting an onset-of-overcharge condition while charging at the existing level of charge current;

means for reducing the voltage lid as a result of the detected onset-of-overcharge condition to limit the current applied to the battery and the overcharge potential;

means for limiting the applied current to the battery to a sufficiently low level to constitute a desired "float charge"; and means for detecting outgassing of said battery, and wherein the onset-of-overcharge condition is determined by the level of detected outgassing which occurs.

69. An apparatus for charging a battery, comprising:

means for applying charging current to the battery at a controlled level limited by a voltage lid;

means for detecting an onset-of-overcharge condition while charging at the existing level of charge current;

means for reducing the voltage lid as a result of the detected onset-of-overcharge condition to limit the current applied to the battery and the overcharge potential;

means for limiting the applied current to the battery to a sufficiently low level to constitute a desired "float charge"; and wherein said charging current is applied stepwise and controlled according to said voltage lid.

70. A method of charging a battery, comprising:

applying a controlled level of charge current to the battery from a controllable current source that forces current through a series resistance, said series resistance comprising the current source and the battery being charged; and modulating current applied to the battery wherein the resultant charge voltage applied to the battery is downwardly modulated in response to an onset-of-overcharging condition and wherein the amount of overcharging potential to which the battery is subjected is limited.

71. An apparatus for charging a battery, comprising:

means for applying a controlled level of current to the battery;

wherein said controlled level of current is applied through a series resistance, said series resistance comprising the voltage source and the battery being charged; and means for modulating current applied to the battery wherein the resultant charge voltage applied to the battery is downwardly modulated in response to an onset-of-overcharging condition and wherein the amount of overcharging potential to which the battery is subjected is limited.

\* \* \* \* \*